United States Patent
Leem et al.

(10) Patent No.: US 9,405,455 B2
(45) Date of Patent: Aug. 2, 2016

(54) MOBILE TERMINAL AND CONTROLLING METHOD THEREOF

(71) Applicant: LG ELECTRONICS INC., Seoul (KR)

(72) Inventors: Chaesung Leem, Seoul (KR); Eulina Ko, Seoul (KR); Hosoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 14/168,870

(22) Filed: Jan. 30, 2014

(65) Prior Publication Data

US 2014/0213318 A1 Jul. 31, 2014

(30) Foreign Application Priority Data

Jan. 31, 2013 (KR) .................. 10-2013-0011449

(51) Int. Cl.
*H04M 1/00* (2006.01)
*G06F 3/0486* (2013.01)
(Continued)

(52) U.S. Cl.
CPC .......... *G06F 3/0486* (2013.01); *G06F 3/04886* (2013.01); *H04L 12/1827* (2013.01); *H04L 51/04* (2013.01); *H04M 1/27455* (2013.01); *H04M 1/72552* (2013.01); *H04M 1/72586* (2013.01); *G06F 2203/04803* (2013.01); *G06F 2203/04808* (2013.01);
(Continued)

(58) Field of Classification Search
CPC ... G06F 3/0481; G06F 3/0484; G06F 3/0486; G06F 2203/04803; H04N 1/2125; H04M 1/72555

USPC ........................ 455/566, 414.1, 416
See application file for complete search history.

(56) References Cited

U.S. PATENT DOCUMENTS

| | | | | |
|---|---|---|---|---|
| 8,447,070 B1 * | 5/2013 | Bozarth | ................... | H04N 7/18 382/103 |
| 8,451,344 B1 * | 5/2013 | Karakotsios | ........... | H04N 5/772 348/211.11 |

(Continued)

FOREIGN PATENT DOCUMENTS

| EP | 1 777 611 A1 | 4/2007 |
| EP | 2 207 342 A2 | 7/2010 |

(Continued)

OTHER PUBLICATIONS

Papworth, "Facial Recognition, Privacy and Social Media," Laurel Papworth@SilkCharm, May 19, 2011, XP055158930, http://laurelpapworth.com/facial-recognition-privacy-and-social-media/, 4 pages.

(Continued)

*Primary Examiner* — Duc M Nguyen
(74) *Attorney, Agent, or Firm* — Birch, Stewart, Kolasch & Birch, LLP

(57) ABSTRACT

A mobile terminal including a wireless communication unit configured to perform wireless communication; a touchscreen configured to display information; and a controller that partitions the touchscreen into a first region and second region, displays a chat window for displaying chatting contents included in a chatting session with at least one counterpart terminal in the first region, displays data different than the chat window in the second region, receives a touch input applied to a first point inside the second region and a second point inside the first region, and transmits data in the second region to the at least one counterpart terminal.

10 Claims, 33 Drawing Sheets

(51) Int. Cl.
*H04L 12/58* (2006.01)
*H04M 1/725* (2006.01)
*G06F 3/0488* (2013.01)
*H04M 1/2745* (2006.01)
*H04L 12/18* (2006.01)
*G06K 9/00* (2006.01)

(52) U.S. Cl.
CPC ...... *G06K 9/00221* (2013.01); *H04M 2250/22* (2013.01); *H04M 2250/52* (2013.01)

(56) References Cited

U.S. PATENT DOCUMENTS

| | | | | |
|---|---|---|---|---|
| 8,804,006 | B2* | 8/2014 | Kusaka | H04N 1/00281 348/211.2 |
| 2005/0054352 | A1* | 3/2005 | Karaizman | H04M 3/42008 455/456.3 |
| 2005/0162523 | A1* | 7/2005 | Darrell | G06F 17/30864 348/211.2 |
| 2006/0009243 | A1* | 1/2006 | Dahan | H04L 12/281 455/466 |
| 2006/0041627 | A1* | 2/2006 | Tu | H04L 51/04 709/206 |
| 2008/0055269 | A1* | 3/2008 | Lemay | G06F 3/0482 345/173 |
| 2009/0009626 | A1* | 1/2009 | Ko | H04N 1/00251 348/231.3 |
| 2009/0024559 | A1* | 1/2009 | Arrasvuori | G06F 17/30997 |
| 2009/0158212 | A1 | 6/2009 | Dykstra-Erickson et al. | |
| 2010/0005402 | A1 | 1/2010 | George et al. | |
| 2010/0125801 | A1* | 5/2010 | Shin | G06F 1/1616 715/758 |
| 2010/0248788 | A1* | 9/2010 | Yook | G06F 3/0481 455/566 |
| 2011/0080356 | A1* | 4/2011 | Kang | G06F 3/0486 345/173 |
| 2011/0144970 | A1* | 6/2011 | Jiang | G06F 13/105 703/24 |
| 2011/0175930 | A1 | 7/2011 | Hwang et al. | |
| 2011/0275415 | A1* | 11/2011 | Lee | G06F 1/1686 455/566 |
| 2012/0289290 | A1 | 11/2012 | Chae et al. | |
| 2013/0187861 | A1* | 7/2013 | Lavallee | G06F 9/543 345/173 |

FOREIGN PATENT DOCUMENTS

| | | |
|---|---|---|
| EP | 2 254 313 A1 | 11/2010 |
| EP | 2 530 919 A1 | 12/2012 |
| EP | 2 544 433 A1 | 1/2013 |

OTHER PUBLICATIONS

Thornton, "10 WhatsApp features you might have missed", Tips, Softonic, Softonic.com, Nov. 27, 2012, 26 pages, XP055127430.

* cited by examiner

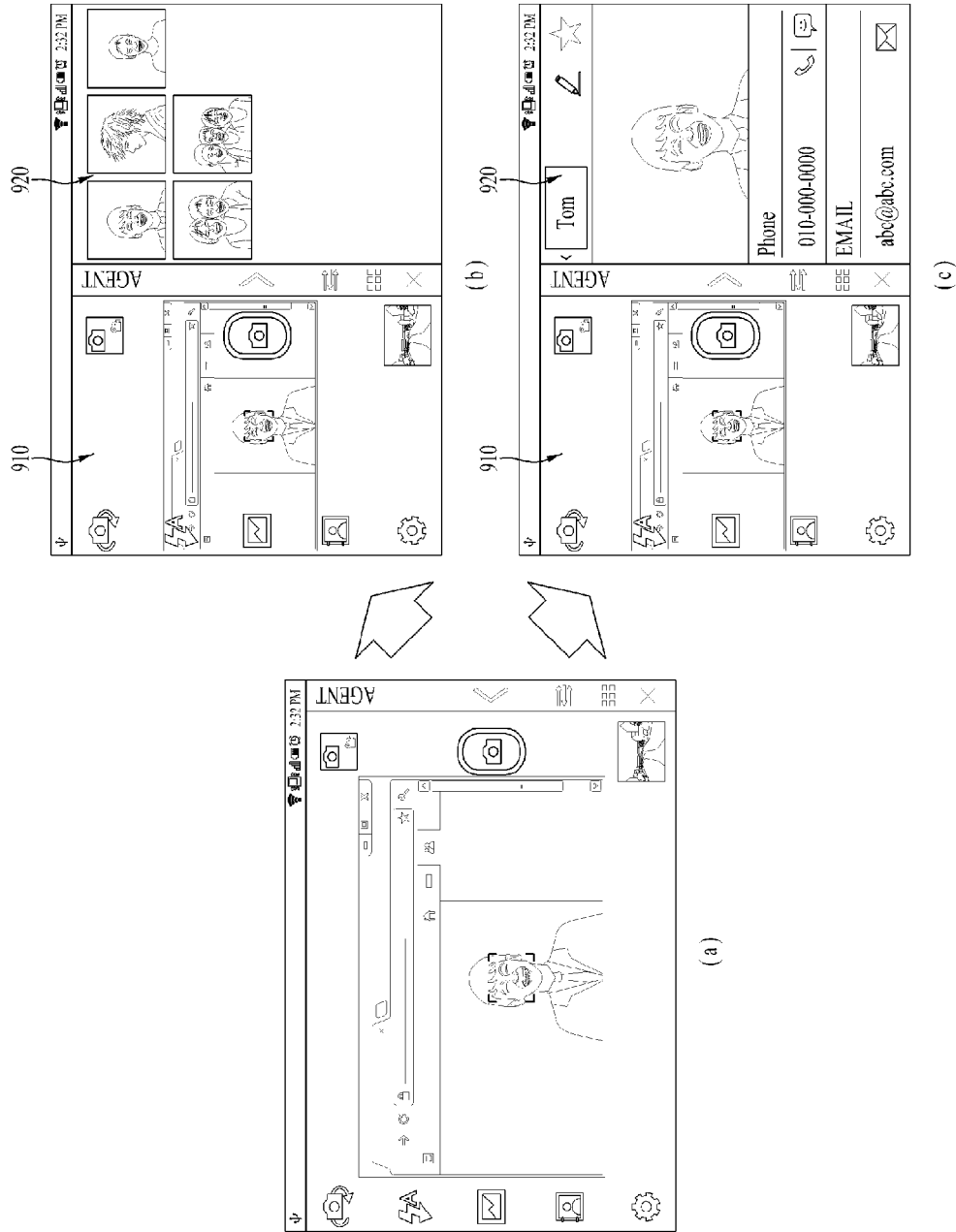

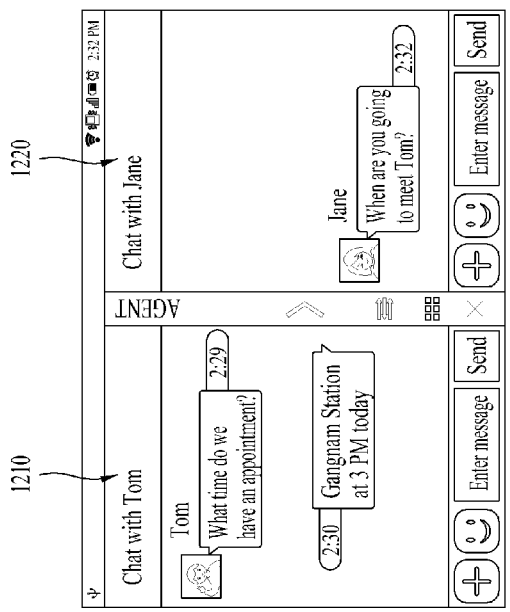

MOBILE TERMINAL AND CONTROLLING METHOD THEREOF

Pursuant to 35 U.S.C. §119(a), this application claims the benefit of earlier filing date and right of priority to Korean Application No. 10-2013-0011449, filed on Jan. 31, 2013, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating data to be shared using a screen partitioned into two regions.

2. Discussion of the Related Art

A mobile terminal is a device which can perform various functions such as data and voice communications, capturing images and video via a camera, recording audio, playing music files and outputting music via a speaker system, and displaying images and video on a display. Generally, terminals can be classified into mobile terminals and stationary terminals. In addition, the mobile terminals can be further classified into handheld terminals and vehicle mounted terminals.

Owing to the ongoing expansion of functions of a mobile terminal, the mobile terminal currently plays a role as a sharing device capable of sharing data with other counterparts anytime, anywhere. However, there is a problem that a process for sharing data through a mobile terminal is not a simple matter.

For instance, in order to transmit an image saved in one mobile terminal to another terminal, a user has to apply a plurality of user inputs: i) a user input for displaying a chat window having a reception destination set to another mobile terminal; ii) a user input for file attachment; iii) a user input for setting an attribute of a file to attach to an image; iv) a user input for selecting an image to attach from an image list; and v) others.

Moreover, when sharing data through a plurality of the above-enumerated user inputs, a user should select a data to share by interrupting a chat with a prescribed counterpart for a while. Hence, it causes a problem that the user is unable to check a message received from the chat counterpart while selecting the data to share.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which a data sharing is facilitated using a screen partitioned into two regions.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a wireless communication unit configured to perform wireless communication, a touchscreen configured to be partitioned into a first region and a second region, and a controller, if a touch input is applied to a first point inside the first region and a second point inside the second region while a chat window for a chat with a counterpart is displayed through the first region, configured to control shared data in the second region to be transmitted to the counterpart.

In another aspect of the present invention, a method of controlling a mobile terminal according to another embodiment of the present invention may include the steps of partitioning a touchscreen into a first region and a second region, receiving a touch input to a first point inside the first region and a second point inside the second region while a chat window for a chat with a counterpart is displayed through the first region, and transmitting shared data in the second region to the counterpart in response to the touch input.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 9 is a diagram illustrating one example to describe a process for partitioning a touchscreen into a first region and a second region when a prescribed character is detected from a preview image output from a camera using face recognition;

FIGS. 12A to 12C are diagrams illustrating one example to describe an operation of a mobile terminal if a first application and a second application are identical to each other;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, the present invention is also applicable to a fixed terminal as a digital TV, a desktop computer and the like as well as a mobile terminal.

Figure 1:
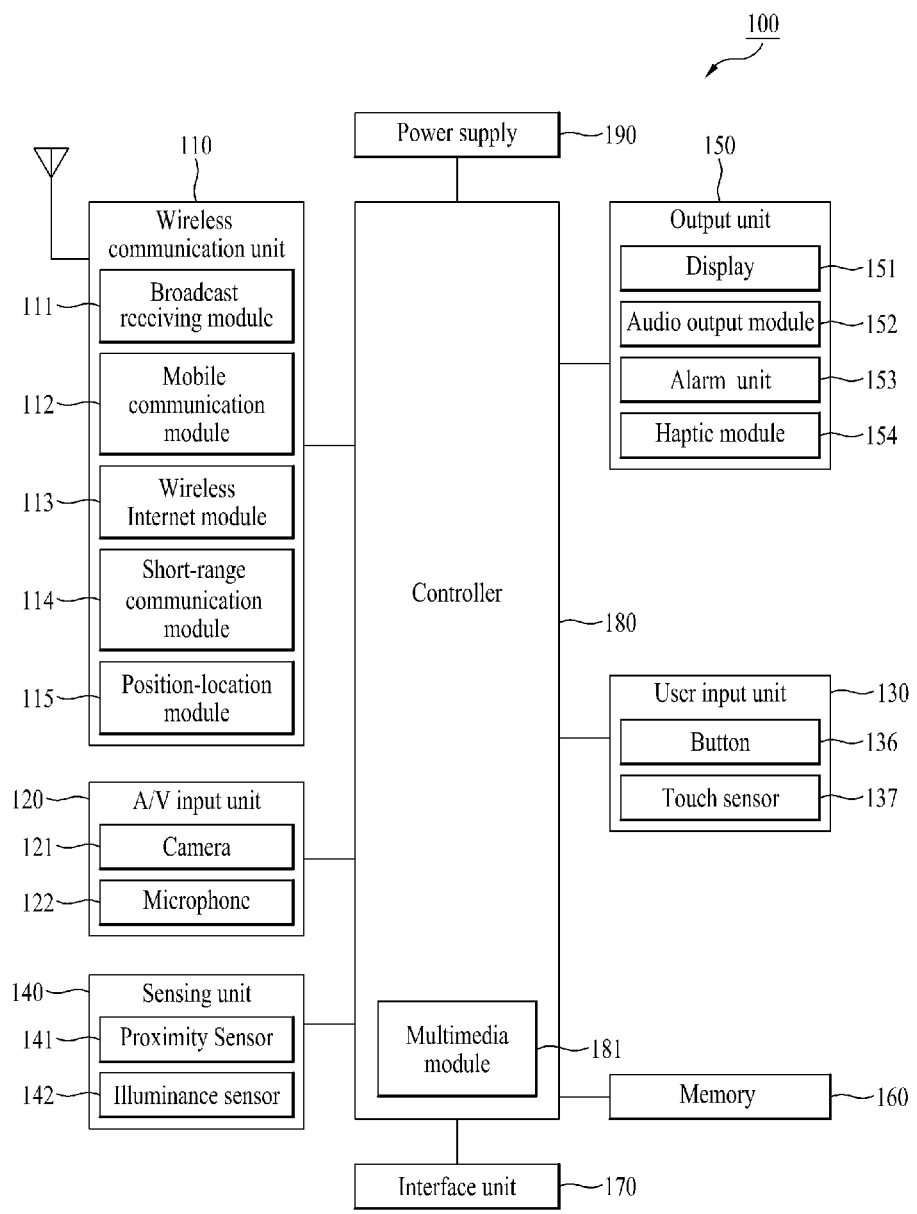
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By a non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated during receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor 137 configures a mutual layer structure (hereinafter called 'touch screen'), it can use the display 151 as an input device as well as an output device. In this instance, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it can configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 2:
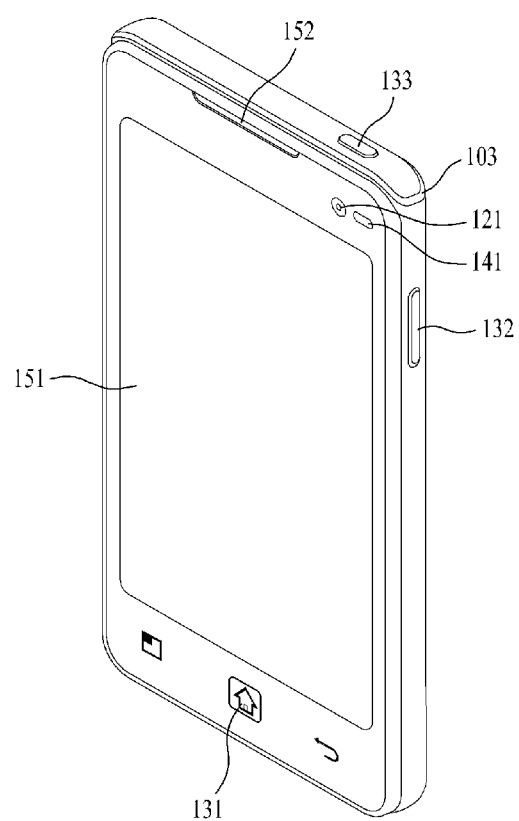
FIG. 2 is a front perspective diagram of a mobile terminal according to one embodiment of the present invention.

Referring to FIG. 2, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen. An illumination sensor 142 may also be included in the sensing unit 140.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention. The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Figure 3:
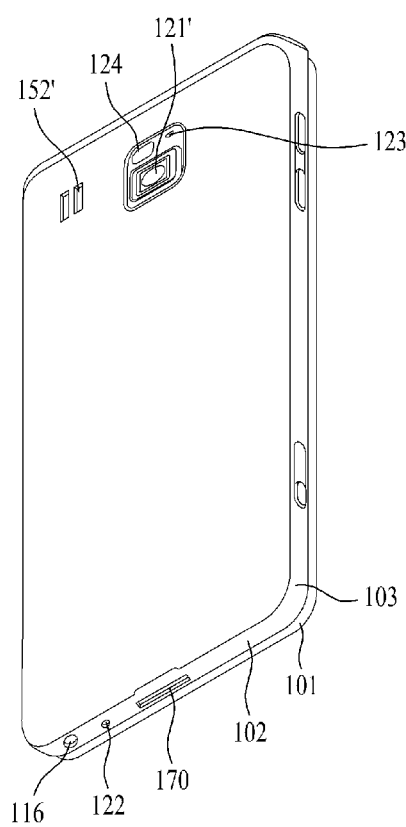
FIG. 3 is a rear perspective diagram of a mobile terminal according to one embodiment of the present invention.

Referring to FIGS. 2 and 3, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

In the following description, embodiments relating to a controlling method implemented in the above-configured mobile terminal shall be explained with reference to the accompanying drawings.

For clarity and convenience of the following description, assume that a mobile terminal mentioned in the following description includes at least one of the components shown in FIG. 1. In particular, assume that a mobile terminal according to the present invention includes the wireless communication unit 110 configured to perform a wireless communication, the display unit 151 partitioned into a first region and a second region, and the controller 180. In this instance, if a touch input is applied to a first point inside the first region and a second point inside the second region, the controller 180 controls a shared data in the second region to be transmitted to a counterpart. In some cases, the mobile terminal according to the present invention may further include the camera 121 for photographing and the memory 160 for data storage.

For clarity and convenience of the following description, an application running in the first region of the display unit 151 shall be named a first application and an application running in the second region of the display unit 151 shall be named a second application. The first and second applications mentioned in the following description of embodiments are just discriminated from each other in that an active screen of the corresponding application is output through which region of the display unit 151 and may not mean different applications. For instance, When an active screen of a camera application for photographing is output through the first region, the camera application may be regarded as the first application mentioned in the description of the present invention. If the camera application is output through the second region, the camera application may be regarded as the second application mentioned in the description of the present invention.

If the display unit 151 of the mobile terminal according to the present invention includes a touchscreen, implementation of the following embodiments may be further facilitated. Therefore, the following description is made on the assumption that the display unit 151 includes the touchscreen. Yet, it may be unnecessary for the display unit 151 to include the touchscreen. If the display unit 151 does not include the touchscreen, the mobile terminal according to the present invention may further include a separate input unit (e.g., the user input device 130 shown in FIG. 1) configured to receive a user input.

For clarity and convenience of the following description, a person intending to use the mobile terminal according to the present invention may be named 'user', while a specific person intending to perform a communication with the mobile terminal according to the present invention or a mobile terminal of the specific person may be named 'counterpart'.

In addition, a text message (e.g., a short message service (SMS) message, a long message service (LMS) message, a multimedia message service (MMS) message, etc.) with a counterpart as a text message or an instant message (IM) may be named 'message'.

Moreover, a text message application for transceiving a text message and or a messenger application for transceiving an instant message may be named 'message application.

In the mobile terminal according to the present invention, one operation before partitioning the touchscreen into the first region and the second region can be discriminated from another operation for facilitating a data sharing with a prescribed counterpart after partitioning the touchscreen into the first region and the second region. For clarity, the mobile terminal according to the present invention will be described in detail by discriminating one operation before partitioning the touchscreen into the first region and the second region and another operation for facilitating a data sharing with a prescribed counterpart after partitioning the touchscreen into the first region and the second region from each other.

<Partitioning Touchscreen into First Region and Second Region>

Figure 4:
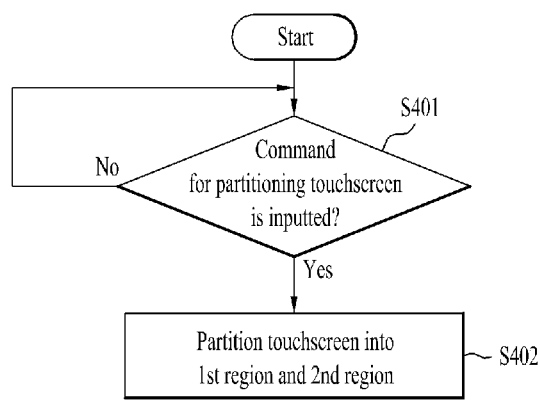
FIG. 4 is a flowchart illustrating an operation of a mobile terminal according to the present invention.

FIG. 4 is a flowchart illustrating an operation of a mobile terminal according to the present invention. Referring to FIG. 4, if a user input for partitioning the touchscreen into a first region and a second region is received from a user or a prescribed event occurs (Yes in S401), the controller 180 can partition the touchscreen into the first region and the second region in response to the user input or the event occurrence (S402). When the touchscreen is partitioned into the first region and the second region, the controller 180 can display an output image, which is output before the touchscreen is partitioned into the first region and the second region, on one of the first region and the second region.

A process for partitioning the touchscreen into the first region and the second region is described in detail with reference to the accompanying drawings. For clarity and convenience of the following description, assume that the output image before partitioning the touchscreen into the first region and the second region is displayed through the first region in the accompanying drawings.

Figure 5:
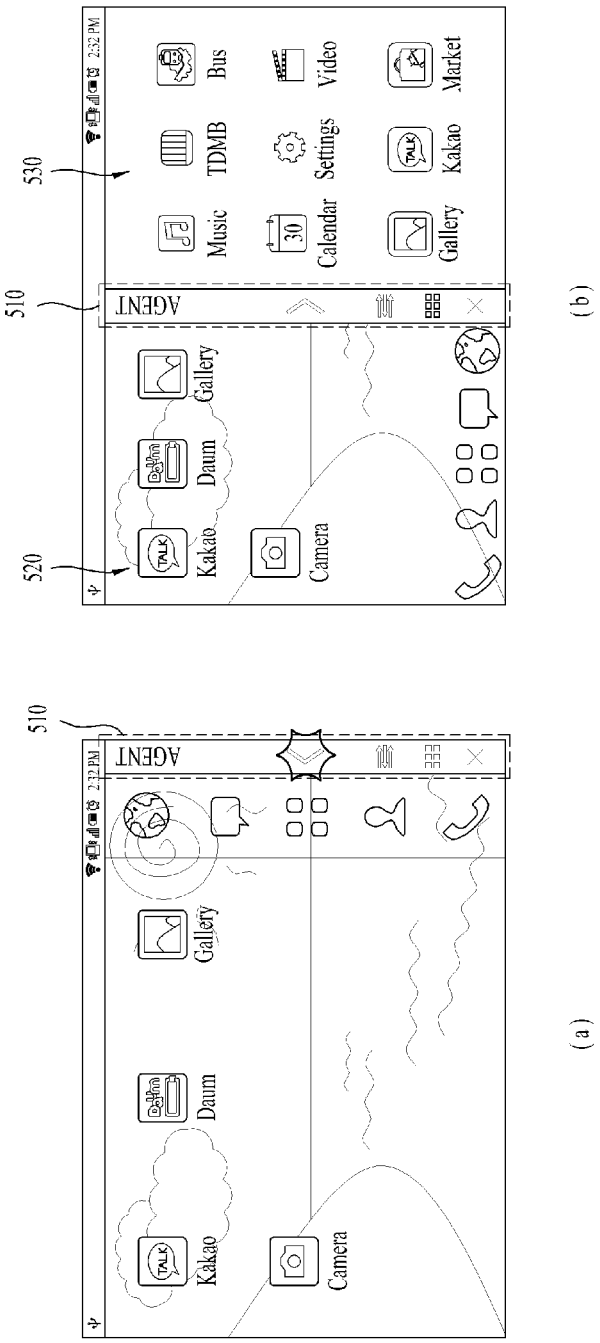
FIG. 5 is a diagram illustrating one example to describe a process for partitioning a touchscreen into a first region and a second region.

FIG. 5 is a diagram illustrating one example to describe a process for partitioning a touchscreen into a first region and a second region. Referring to FIG. 5, a display agent bar 510 is displayed to partition the touchscreen into the first region and the second region for example. The display agent bar 510 shown in FIG. 5 is provided to partition the touchscreen into the first region and the second region. By the display agent bar 510, the touchscreen can be partitioned into the first region and the second region.

For instance, if the display agent bar 510 displayed on one end (e.g., a right end in FIG. 5 (*a*)) of the touchscreen is touched or the display agent bar 510 is touched and dragged to a middle part of the touchscreen (FIG. 5 (*a*)), the controller 180 shifts the display agent bar 510 to the middle part of the touchscreen and can control left and right parts of the touchscreen to be partitioned into a first region 520 and a second region 530, respectively, by taking the display agent bar 510 as a boundary in-between (FIG. 5 (*b*)).

If the touchscreen is partitioned into the first region 520 and the second region 530, the controller 180 can display an output image, which was output before the touchscreen is partitioned into the two regions, on the first region 520. For instance, if a home screen is output through the touchscreen before partitioning the touchscreen into the two regions (FIG. 5 (*a*)), the controller 180 can control the home screen to be output to the first region 520 after the touchscreen has been partitioned into the two regions.

Unlike the example shown in FIG. 5 (*a*), if an active screen of a prescribed application is output through the touchscreen before partitioning the touchscreen into the two regions, the controller 180 can control the active screen of the prescribed application, which has been active before partitioning the touchscreen into the two regions, to keep being output to the first region 520 while partitioning the touchscreen into the two regions.

The second region 530 is provided to display an active screen of a second application. In addition, the controller 180 can control the second application to be activated automatically or manually in response to a user input.

In order to activate the second application manually in response to a user input, referring to FIG. 5 (*b*), the controller 180 can control an application list to be initially displayed on the second region 530. If a prescribed application is selected from the application list displayed on the second region 530, the controller 180 activates the selected application and can then display an active screen of the activated application through the second region 530.

The application list displayed on the second region 530 may include at least one of a list of applications installed on the mobile terminal, a list of recently activated applications, a list of applications currently running in a background state, and a list of frequently-run applications amounting to a prescribed number or less. Moreover, the controller 180 may display at least two of the above-enumerated application lists on the second region 530. For instance, the controller 180 can display the list of the applications installed on the mobile terminal and the list of the frequently-run applications amounting to a prescribed number or less by being sorted by different groups.

The controller 180 can activate the second application automatically without waiting for a user input. In doing so, if the touchscreen is partitioned into the first region 520 and the second region 530, the controller activates a prescribed application immediately and is then able to control an active screen of the prescribed application to be output through the second region 530 of the touchscreen.

In this instance, the automatically activated prescribed application may include one of an application pre-designated by a user, a most recently activated application, a most frequently used application and an application identical to a former application running through the first region 520.

Meanwhile, FIG. 5 shows that the touchscreen is partitioned into two regions while a mode of the mobile terminal is set to a landscape mode. However, the touchscreen can be partitioned into two regions while the mode of the mobile terminal is set to a portrait mode.

Figure 6:
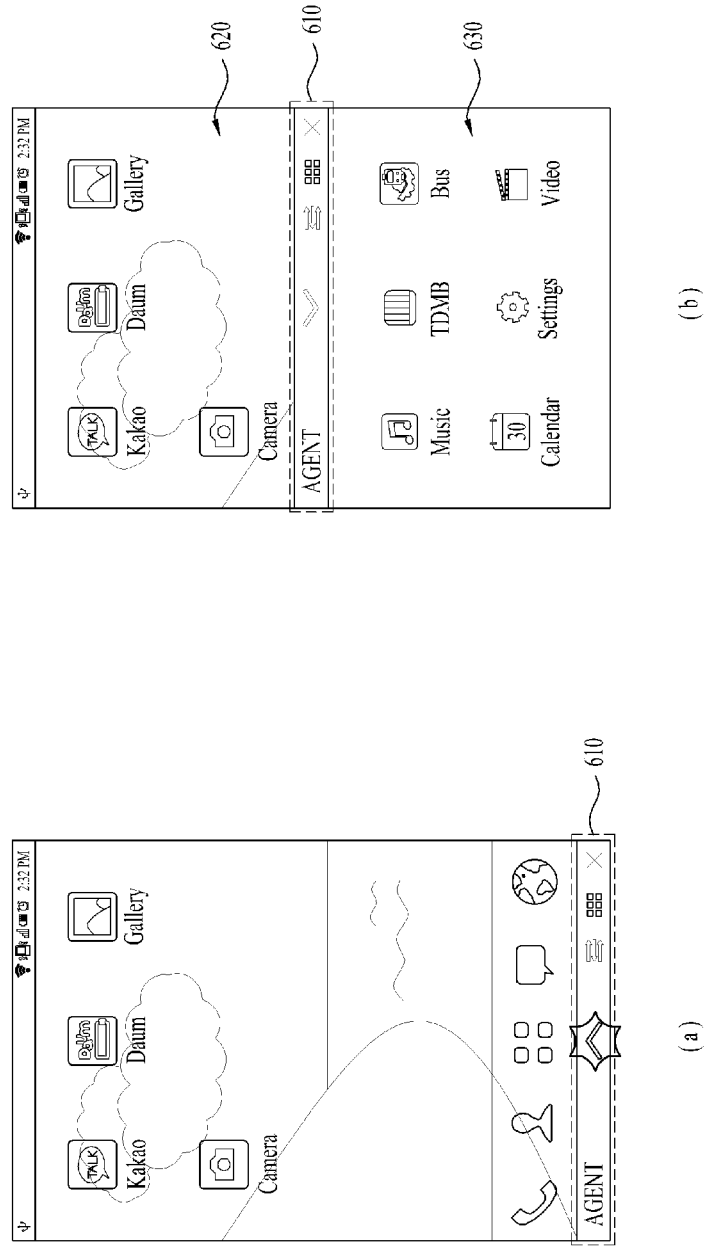
FIG. 6 is a diagram illustrating one example to describe a process for partitioning a touchscreen into two regions in portrait mode of a mobile terminal.

Next, FIG. 6 is a diagram illustrating one example to describe a process for partitioning a touchscreen into two regions in portrait mode of a mobile terminal. Referring to FIG. 6, if a display agent bar 610 provided to one end of the touchscreen (e.g., a bottom part of the touchscreen in FIG. 6 (*a*)) is touched or touched & dragged to a middle part of the touchscreen (FIG. 6 (*a*)), the controller 180 shifts the display agent bar 610 to a middle part of a screen and is then able to partition the touchscreen into a top part and a bottom part of the touchscreen (i.e., a first region 620 and a second region 630) by taking the display agent bar 610 as a boundary in-between.

In the examples shown in FIG. 5 and FIG. 6, the display agent bar 510/610 is touched or touched & dragged so that the touchscreen can be partitioned into the two regions. On the other hand, according to another embodiment of the present invention, when such an object as an icon of an application intended to be newly activated, a message exchanged with a prescribed counterpart, a contact with a prescribed counterpart and the like is dragged to the display agent bar 610, the touchscreen may be partitioned into two regions. This process shall be described in detail with reference to FIG. 7 as follows.

Figure 7A:
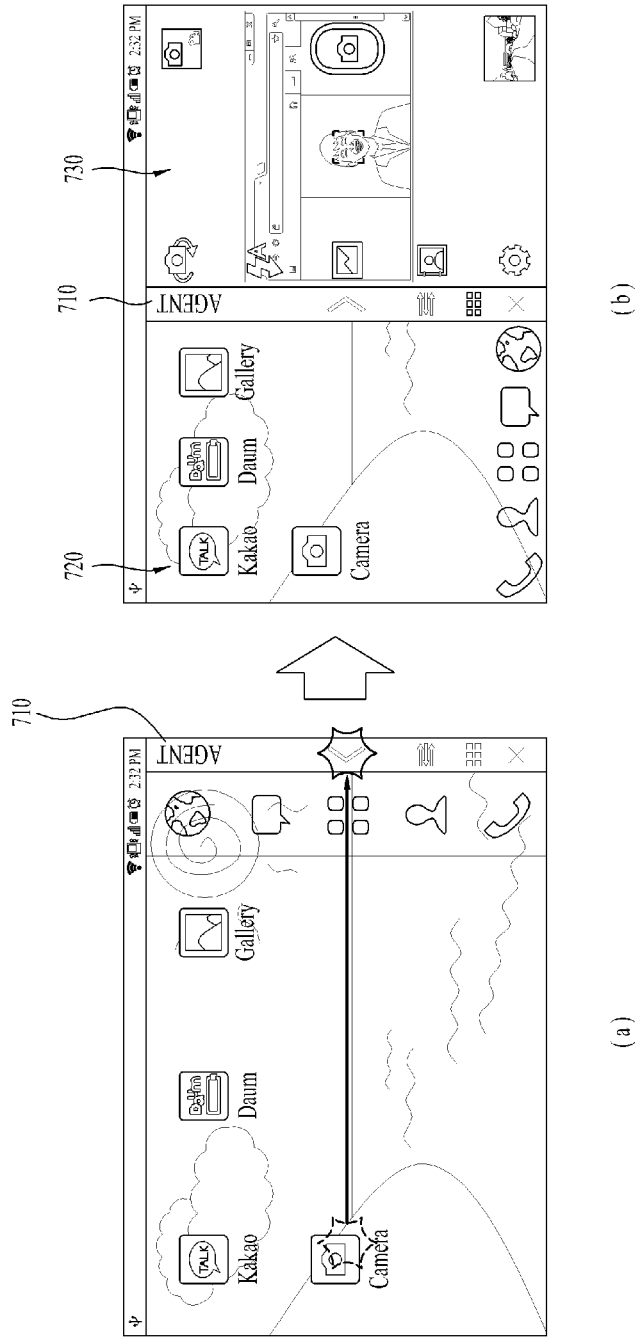
FIGS. 7A to 7C are diagrams illustrating one example to describe a process for partitioning a touchscreen into a first region and a second region when a prescribed object is dragged to a display agent bar.
Figure 7B:
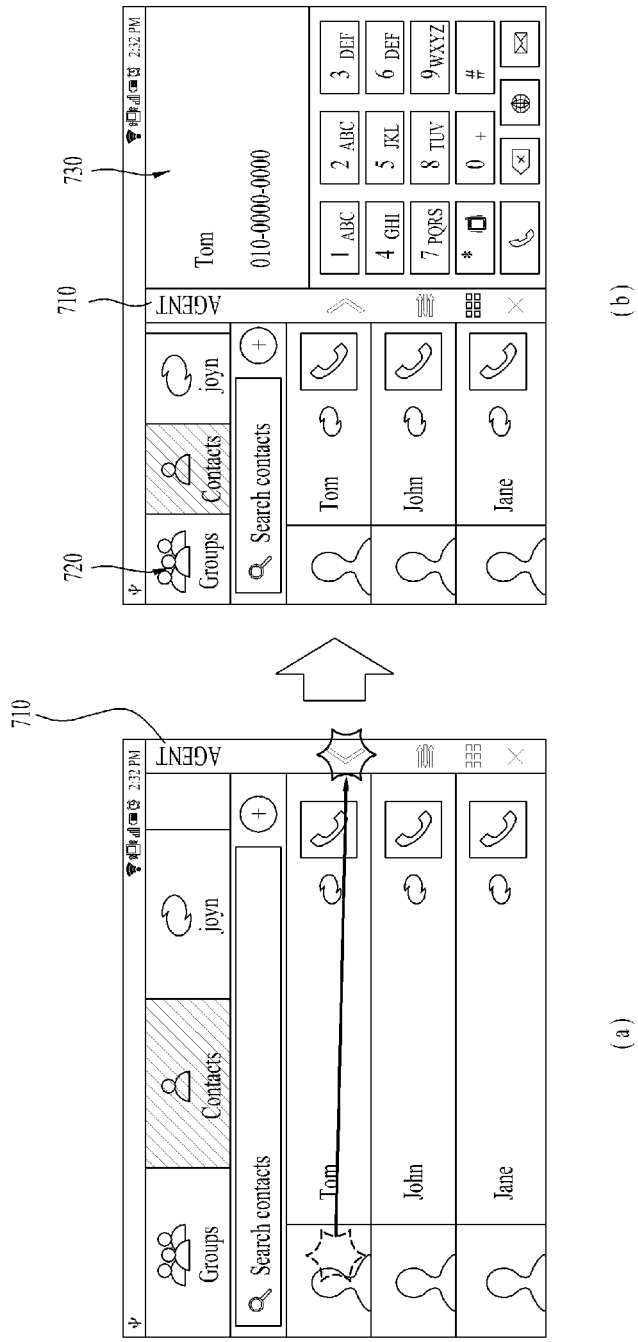
Figure 7C:
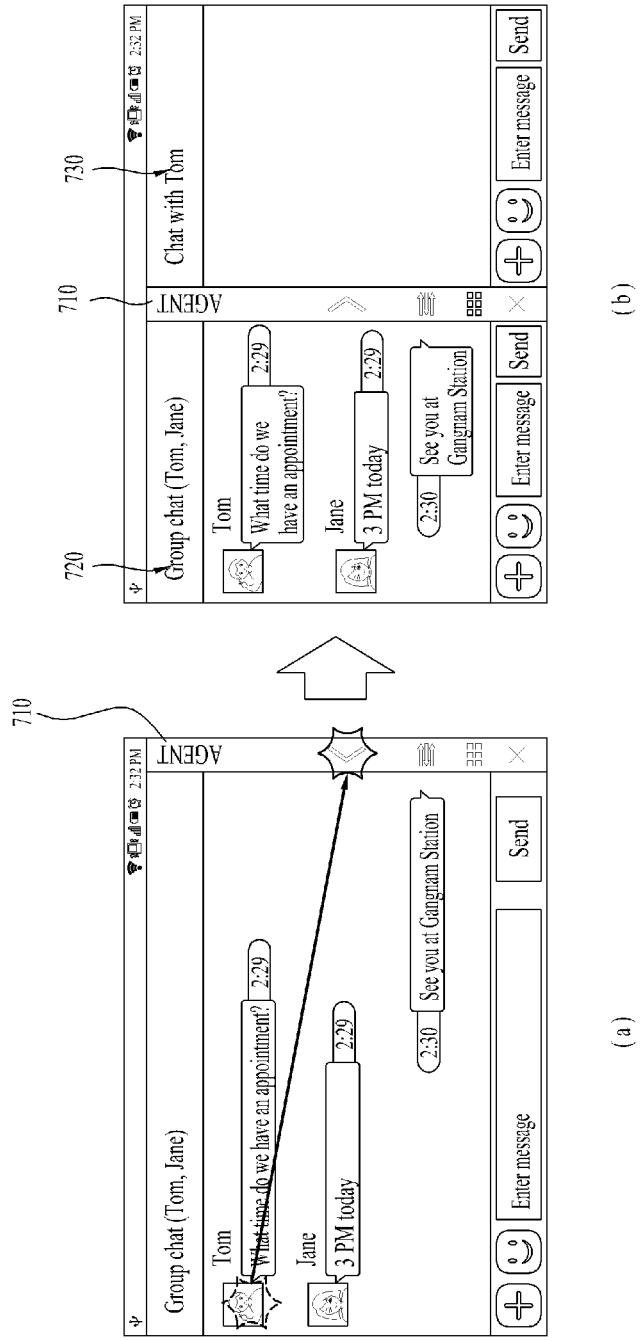

FIGS. 7A to 7C are diagrams illustrating one example to describe a process for partitioning a touchscreen into a first region and a second region when a prescribed object is dragged to a display agent bar. Referring to FIG. 7A, if an application icon output through the touchscreen is dragged to a display agent bar 710, the controller 180 partitions the touchscreen into a first region 720 and a second region 730. In doing so, the controller 180 displays an output image before partitioning the touchscreen into the two regions on the first region 720, and also displays an active screen of a prescribed application corresponding to the application icon dragged to the display agent bar 710 on the second region 730, simultaneously. Like the example shown in FIG. 7A, if a camera icon for photographing is dragged to the display agent bar 710, the controller 180 partitions the touchscreen into the first region 720 and the second region 730 and also displays an image of a home screen output before partitioning the touchscreen into the two regions and an active screen of the camera application on the first region 720 and the second region 730, respectively.

FIG. 7B is a diagram of an example to describe an operation of the mobile terminal when a contact of a prescribed counterpart is dragged to the display agent bar 710.

Referring to FIG. 7B, when a contact of a prescribed counterpart is dragged to the display agent bar 710, the controller 180 partitions the touchscreen into a first region 720 and a second region 730. In doing so, the controller 180 can also display an output image before partitioning the touchscreen into the two regions and a screen for making contact with a prescribed counterpart on the first region 720 and the second regions, respectively.

In this instance, the screen for making contact with the prescribed counterpart may include one of a dialer screen for making a phone call to the prescribed counterpart, a text message creating screen for displaying chat contents using a text message (e.g., SMS message, LMS message, MMS message, etc.) exchanged with the prescribed counterpart, an email creating screen for sending an email to the prescribed counterpart, an instant message creating screen for displaying chat contents using an instant message (IM) exchanged with the prescribed counterpart and the like.

Next, FIG. 7C is a diagram of one example to describe an operation of the mobile terminal if a profile object of at least one counterpart or a message received from at least one counterpart is dragged to the display agent bar 710 during a group chat with a plurality of counterparts.

Referring to FIG. 7C, while a group chat with a plurality of counterparts is in progress, if a profile object of a prescribed counterpart or a message received from a prescribed counterpart is dragged to the display agent bar 710, the controller 180 partitions the touchscreen into a first region 720 and a second region 730, displays a window for a chat with a plurality of the counterparts, which corresponds to an output image before partitioning the touchscreen into the two regions, on the first region 720, and also displays a window for a chat with a prescribed one of a plurality of the counterparts on the second region 730. In this instance, the profile object may include at least one of a profile image of a counterpart and a chat nickname of a chat counterpart.

In FIG. 7C, while a group chat with Tom and Jane is in progress, since a profile object Tom is dragged to the display agent bar 710, one chat window for a group chat with Tom and Jane is displayed on the first region 720 and another chant window for a chat with Tom is displayed on the second region 730.

As the touchscreen is partitioned into the first region 720 and the second region 730, a message input through the first region 720 is sent to each of a plurality of the chat counterparts, while a message input through the second region 730 is sent to a prescribed counterpart only. Moreover, the controller 180 controls a chat content with the prescribed counterpart to be extracted only from chat contents with a plurality of the counterparts displayed through the first region 720 and also displays the extracted chat content through the second region 730, while displaying a chat window of a chat with a prescribed counterpart through the second region 730.

Like the example shown in FIG. 7, when such a prescribed object as an application icon, a contact of a prescribed counterpart, a profile icon of a prescribed counterpart, a message received from a prescribed counterpart and the like is dragged to the display agent bar 710, the controller 180 can partition the touchscreen into the first region 720 and the second region 730 as well.

In the examples shown in FIGS. 5 to 7, if a touch input is applied to a display agent bar displayed on the touchscreen or a prescribed content is dragged to the display agent bar, the touchscreen can be partitioned into a first region and a second region. When a prescribed event occurs, a mobile terminal according to one embodiment of the present invention can partition a touchscreen into a first region and a second region. In this instance, the prescribed event for partitioning the touchscreen into the two regions can include one of such an event for communication with another terminal as receiving a message, receiving an email, receiving a call signal during running a prescribed application and the like and such an event as detecting a face from a preview image output from the camera 121 and the like. A process for partitioning a touchscreen into a first region and a second region in response to an event occurrence shall be described in detail with reference to FIG. 8 and FIG. 9 as follows.

FIGS. 8A to 8E are diagrams illustrating one example to describe a process for partitioning a touchscreen into a first region and a second region when an event for communication with another terminal occurs. For clarity of the following description, assume that the mobile terminal activates a message application for a chat with a first counterpart before the touchscreen is partitioned into the first region and the second region.

Figure 8A:
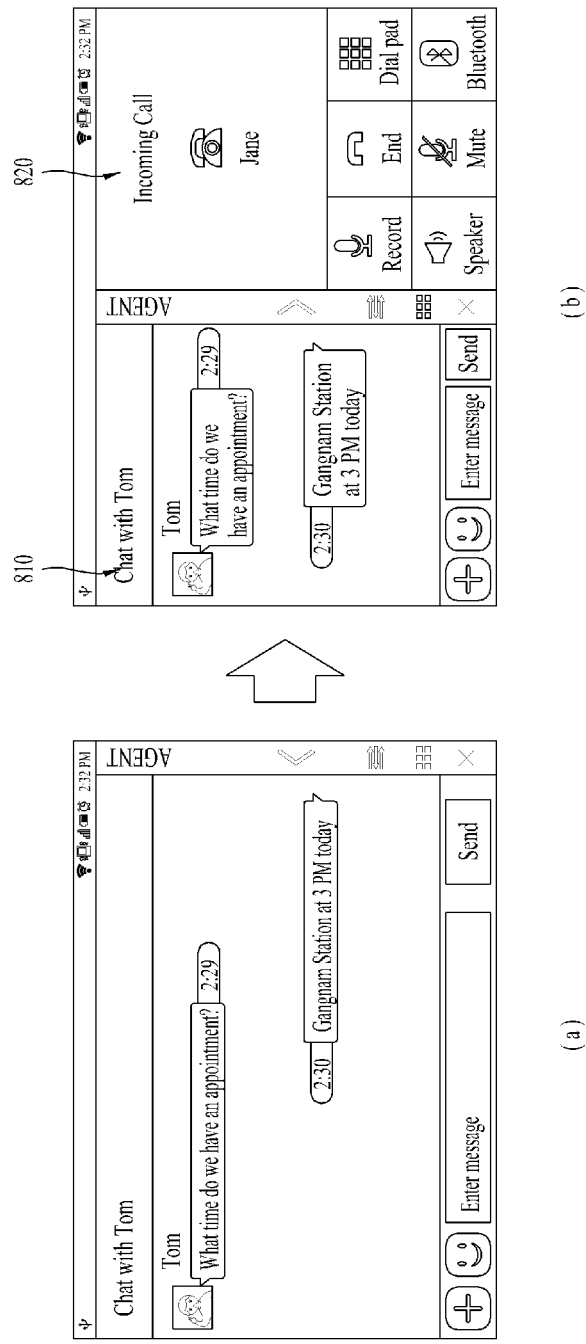
FIGS. 8A to 8E are diagrams illustrating one example to describe a process for partitioning a touchscreen into a first region and a second region when an event for communication with another terminal occurs.

Referring to FIG. 8A, while a chat window with the first counterpart is displayed through the mobile terminal, if the mobile terminal receives a call signal, the controller 180 partitions the touchscreen into a first region 810 and a second region 820, displays an output screen, which has been output before the touchscreen is partitioned, on the first region 810, and also displays a call connection screen on the second region 820.

Figure 8B:
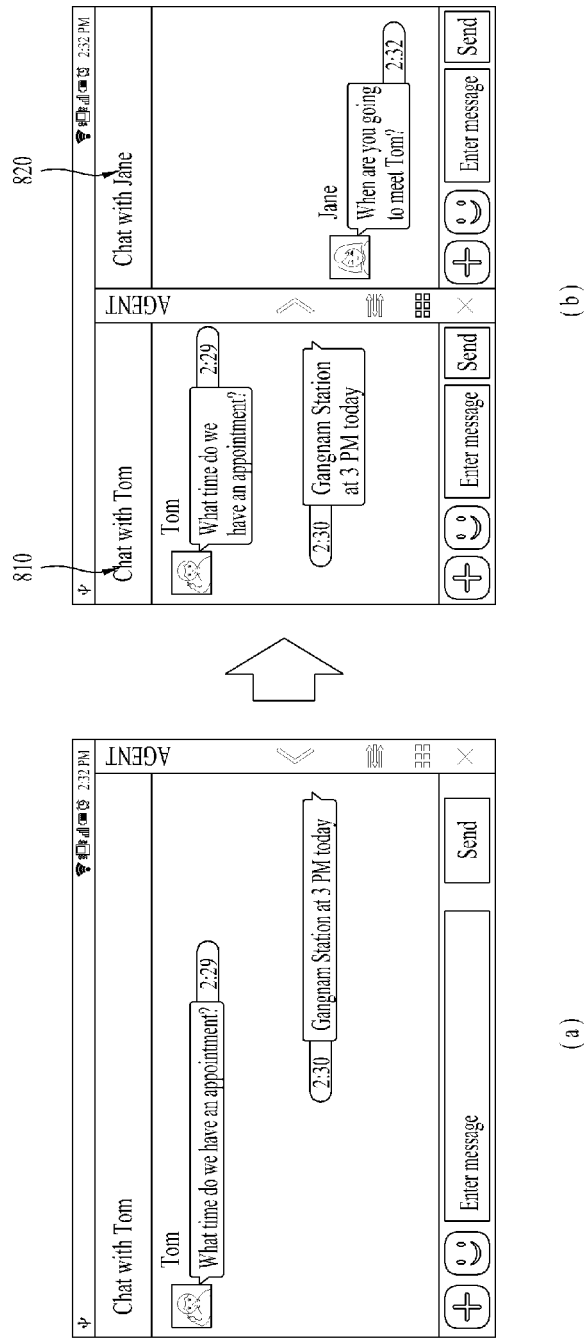
Figure 8C:
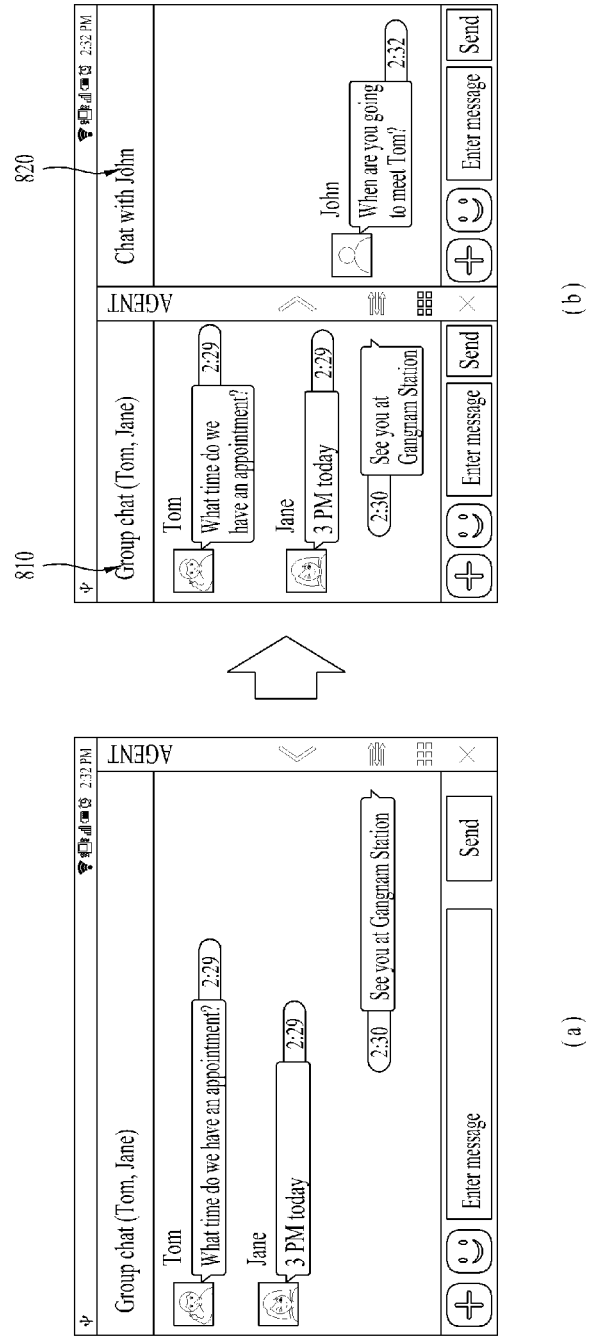

In another instance, referring to FIG. 8B, while a chat window with the first counterpart is displayed through the mobile terminal, if the mobile terminal receives a message from a second counterpart different from the first counterpart, the controller 180 partitions the touchscreen into a first region 810 and a second region 820, displays the chat window with the first counterpart, which has been output before the touchscreen is partitioned into the first region 810 and the second region, on the first region 810, and also displays a chat window with the second counterpart on the second region 820. Hence, a user can have a chat with the first counterpart through the first region 810 of the touchscreen and can also have a chat with the second counterpart through the second region 820.

In the example shown in FIG. 8B, if the message is received from the second counterpart during the chat with the first counterpart, the touchscreen can be partitioned into the first region 810 and the second region 820. This example can be applied to a group chat. For instance, while a group chat with a first counterpart and a second counterpart is in progress, if a new message is received from a third counterpart, the controller 180 partitions the touchscreen into a first region 810 and a second region 820, displays a group chat window with the first and second counterparts through the first region 810, and also displays a chat window with the third counterpart through the second region 820.

Hence, a user can have a group chat with the first counterpart and the second counterpart through the first region 810 and can also have a chat with the third counterpart. Like the example shown in FIG. 8C, while a group chat with Tom and Jane is in progress, if a new message is received from John, the controller 810 displays a chat window for the group chat with Tom and Jane through the first region 810 and also displays a chat window with John through the second region 820.

While a group chat with a first counterpart and a second counterpart is in progress, if a message is personally received from one of the first counterpart and the second counterpart without using the group chat, the controller 180 partitions the touchscreen into a first region 810 and a second region 820, displays contents of the group chat with the first counterpart and the second counterpart through the first region 810, and displays the message personally received from one of the first counterpart and the second counterpart through the second region 820.

Hence, a user can have the group chat with the first counterpart and the second counterpart through the first region 810 of the touchscreen and can also have a personal chat with one of the first counterpart and the second counterpart through the second region 820 of the touchscreen. Like the example shown in FIG. 8D, while a group chat with Tom and Jane is in progress, if a message is personally received from Tom, the controller 810 may display a chat window for the group chat with Tom and Jane through the first region 810 and display control a chat window with Tom through the second region 820.

Figure 8D:
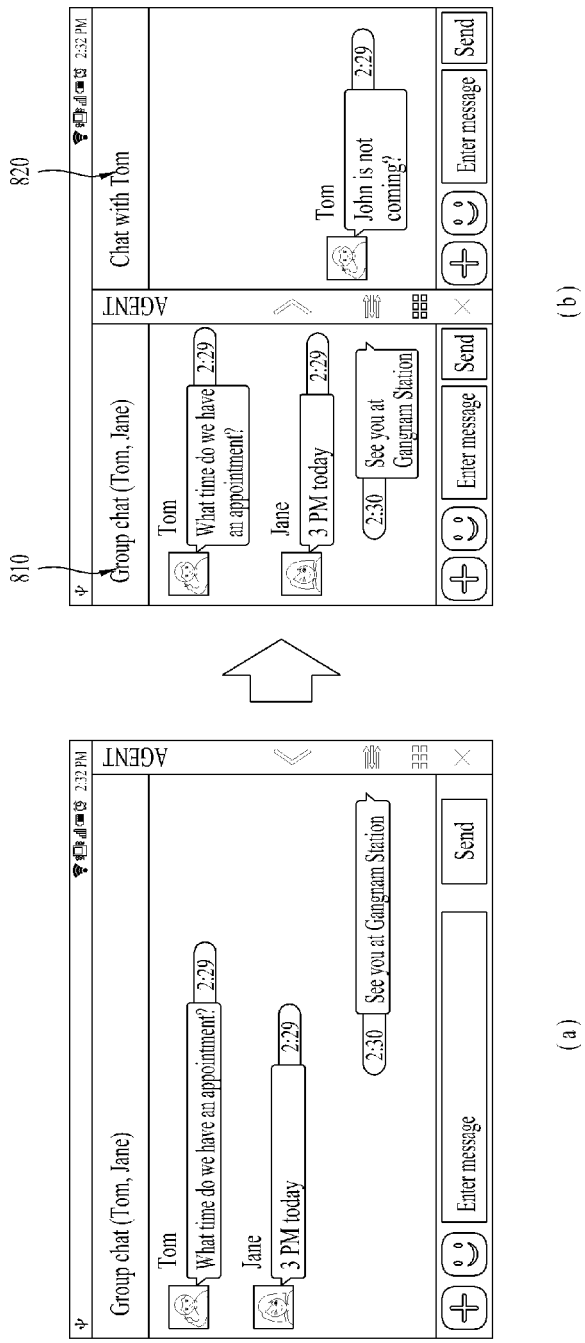

According to another embodiment of the present invention, unlike the example shown in FIG. 8D, the controller 180 may control the touchscreen not to be partitioned into the first region 810 and then second region 820. For instance, while a group chat with a first counterpart and a second counterpart is in progress, if a message is personally received from one of the first counterpart and the second counterpart without using the group chat, the controller 180 does not partition the touchscreen into a first region 810 and a second region 820 but can display the message personally received from one of the first counterpart and the second counterpart on a group chat window with the first counterpart and the second counterpart.

In this instance, the personally received message may mean a message of which recipients are designated not as all participants participating in the group chat but as some of the participants participating in the group chat. The controller 180 can display a message personally received from one of the first counterpart and the second counterpart by being visually identifiable from a message received for the group chat. In particular, the controller 180 can display a personally received message and a message received for a group chat by being visually discriminated from each other based on a style of type, a font size, a presence or non-presence of highlight and/or the like.

Figure 8E:
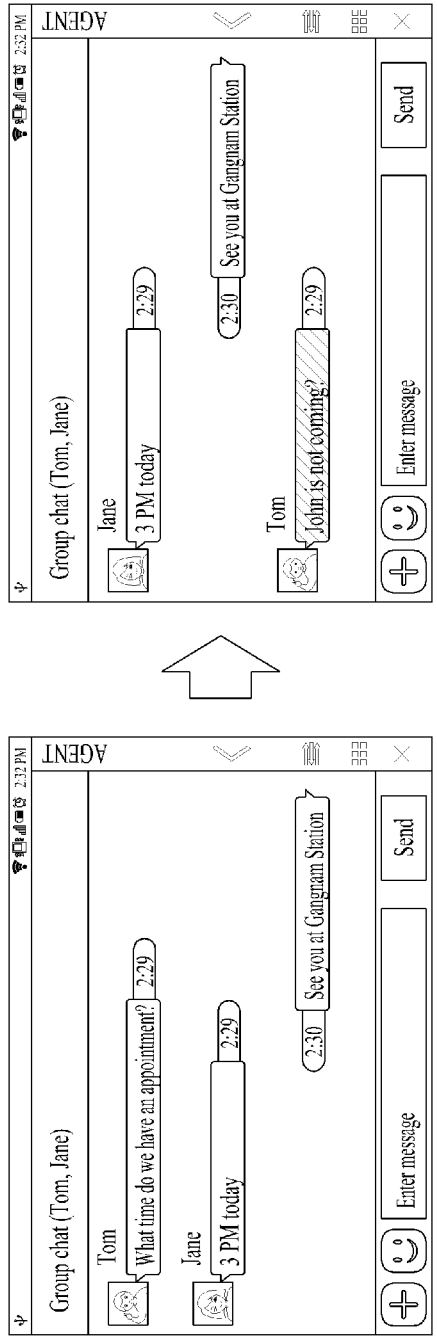

Like the example shown in FIG. 8E, while a group chat with Tom and Jane is in progress, if a message is personally received from Tom, the controller 810 may display a message personally received from Tom by being visually identifiable from other messages. Through this, a user can recognize that the received message is a personal message exchanged with Tom, which is not allowed to be read by Jane.

The embodiment described with reference to FIG. 8E may be applicable in a state that the touchscreen is partitioned into a first region and a second region. For instance, while a chant window for a group chat with a plurality of counterparts is being displayed through the first region of the touchscreen, if a message is personally received from one of a plurality of the counterparts, the controller 180 displays the personally received message on the first region and can also display the personally received message by being visually identifiable from a message for the group chat.

Referring to FIGS. 8A to 8D, if a message or a call signal is received from a prescribed counterpart, the touchscreen is controlled to be automatically partitioned into two regions. Therefore, a user can check a newly received message or make a phone call while a previously performed job is in progress.

FIG. 9 is a diagram illustrating one example to describe a process for partitioning a touchscreen into a first region and a second region when a prescribed character is detected from a preview image output from a camera using face recognition. Referring to FIG. 9 (*a*), if a camera application for photographing is activated, the controller 180 can display a preview image output from the camera 121.

Thereafter, a prescribed character can be detected from the preview image by applying a face recognition algorithm to the preview image, in which the controller 180 partitions the touchscreen into a first region 910 and a second region 920, outputs the preview image, which has been output before the touchscreen is partitioned into the first region 910 and the second region 920, through the first region 910, and also outputs data related to the detected character through the second region 920. In this instance, the data related to the detected character may include at least one of a photo of the detected character and a contact of the detected character.

For instance, referring to FIG. 9 (*b*), if a prescribed character is detected from the preview image displayed on the first region 910, the controller 180 can activate an image viewer application and then output photos of the prescribed character among images saved in the memory 160 through the second region 920. In another instance, referring to FIG. 9 (*c*), if a prescribed character is detected from the preview image displayed on the first region 910, the controller 180 can display a contact of a counterpart, who is determined as the same as the character detected from a phonebook database, through the second region 920.

When an object linked through a hyperlink is selected, the mobile terminal according to one embodiment of the present invention can partition the touchscreen into a first region and a second region. In this instance, the object linked through the hyperlink may include one of a text string linked to a URL (uniform resource locator) address, a text string linked to an email application, a text string linked to a phone number, a preview image linked to an original image and the like. This is described in detail with reference to FIG. 10 as follows.

Figure 10:
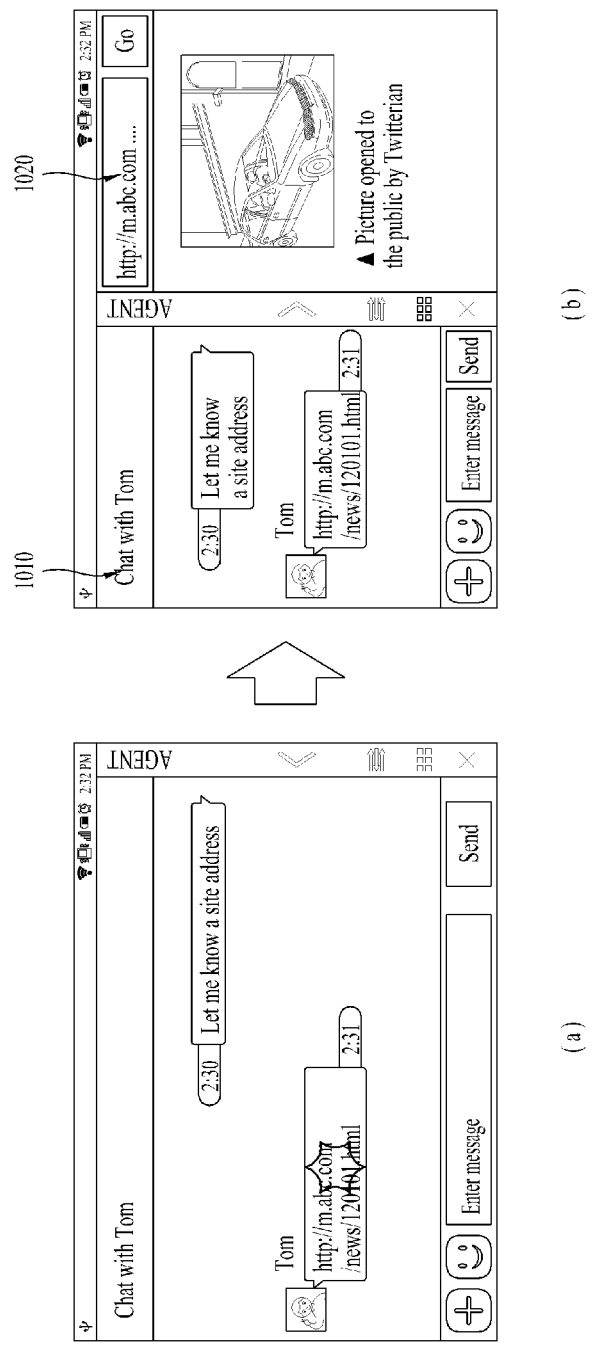
FIG. 10 is a diagram illustrating one example to describe a process for partitioning a touchscreen into a first region and a second region when an object linked through a hyperlink is selected.

FIG. 10 is a diagram illustrating one example to describe a process for partitioning a touchscreen into a first region and a second region when an object linked through a hyperlink is selected. For clarity of the following description, assume that a message application for displaying a content of a chat with a prescribed counterpart is running in the mobile terminal before the touchscreen is partitioned into a first region 1010 and a second region 1020. In addition, assume that an object linked through a hyperlink includes a text string linked to a URL address.

Referring to FIG. 10, if an object linked through a hyperlink is touched (FIG. 10 (*a*)), the controller 180 partitions the touchscreen into the first region 1010 and the second region 1020, displays an active screen of the message application, which has been output before the touchscreen is partitioned, on the first region 1010, and also displays an active screen of the hyperlink having the selected object linked therethrough on the second region 1020 (FIG. 10 (*b*)). Because the touched text string is assumed as linked to the URL address in FIG. 10 (*a*), an active screen of a web browser for an access to the linked URL address may be displayed through the second region 1020.

On the other hand, if the object having the hyperlink linked therethrough includes a text string linked to an email address, an active screen of an email application for sending an email to the linked email address may be displayed on the second region. If the object having the hyperlink linked therethrough includes a text string linked to a phone number, a dialer screen for making a phone call to the linked phone number or a message creating screen for sending a message to the linked phone number may be displayed on the second region. If the object having the hyperlink linked therethrough includes a preview image linked to an original image, the linked original image may be displayed on the second region.

According to the embodiments mentioned in the foregoing description, the first region and the second region of the touchscreen are discriminated from each other by the display agent bar. According to one embodiment of the present invention, a location of the display agent bar placed on a boundary between the first region and the second region can be manually adjusted by a user. By adjusting the location of the display agent bar, a user can manually adjust a size of each of the first region and the second region. For instance, in FIG. 5 (*b*), if a user shifts the display agent bar toward the first region, a size of the first region decreases while a size of the second region increases, for example. On the contrary, if a user shifts the display agent bar toward the second region, a size of the first region increases while a size of the second region decreases, for example.

The methods of partitioning the touchscreen into the first region and the second region described with reference to FIGS. 5 to 10 partially represent various embodiments for partitioning the touchscreen into two regions, by which the present invention may be non-limited. Hence, the touchscreen can be partitioned into two regions by various methods other than the descriptions with reference to FIGS. 5 to 10.

For instance, like the examples shown in FIG. 5 and FIG. 6, if a user input for multitasking is received, the controller 180 can partition the touchscreen into the first region and the second region without using the display agent bar. While the touchscreen is partitioned into the first region and the second region, when attempting to display a virtual keypad, the controller 180 can differentiate a screen configuration depending on whether an output mode of the mobile terminal is set to a portrait mode or a landscape mode. A method of displaying a virtual keypad depending on an output mode of a mobile terminal shall be described in detail with reference to FIGS. 11A to 11C as follows.

Figure 11A:
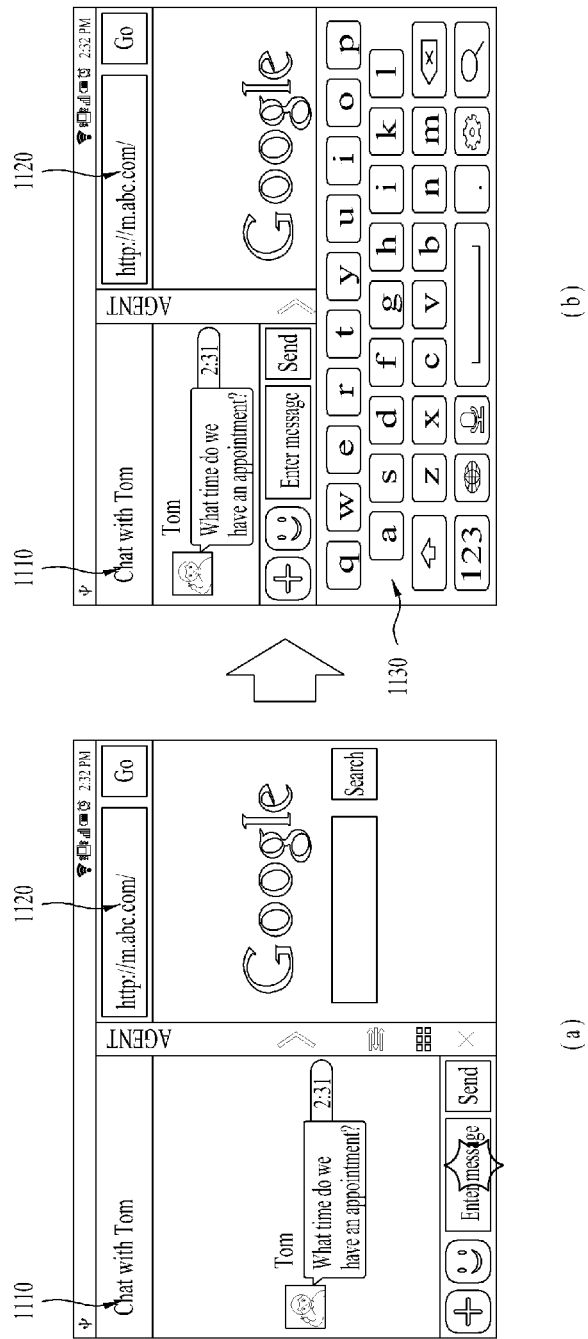
FIGS. 11A to 11C are diagrams illustrating one example to describe a process for outputting a virtual keypad to a touchscreen.
Figure 11B:
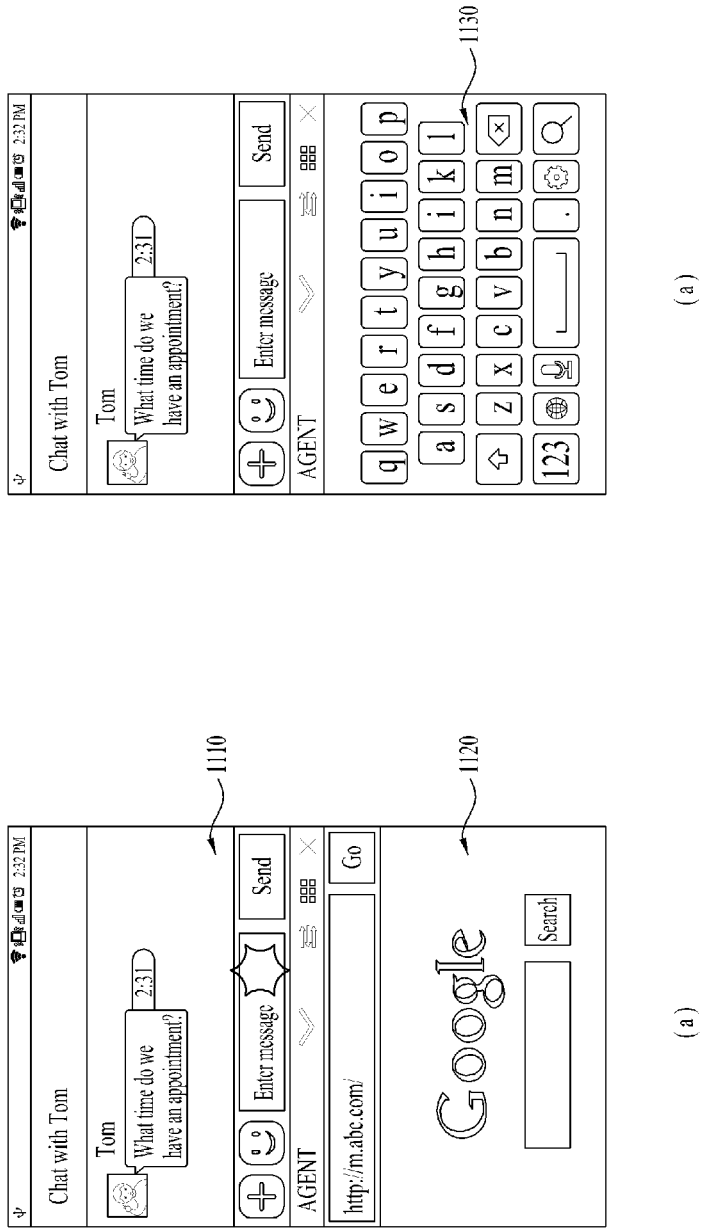
Figure 11C:
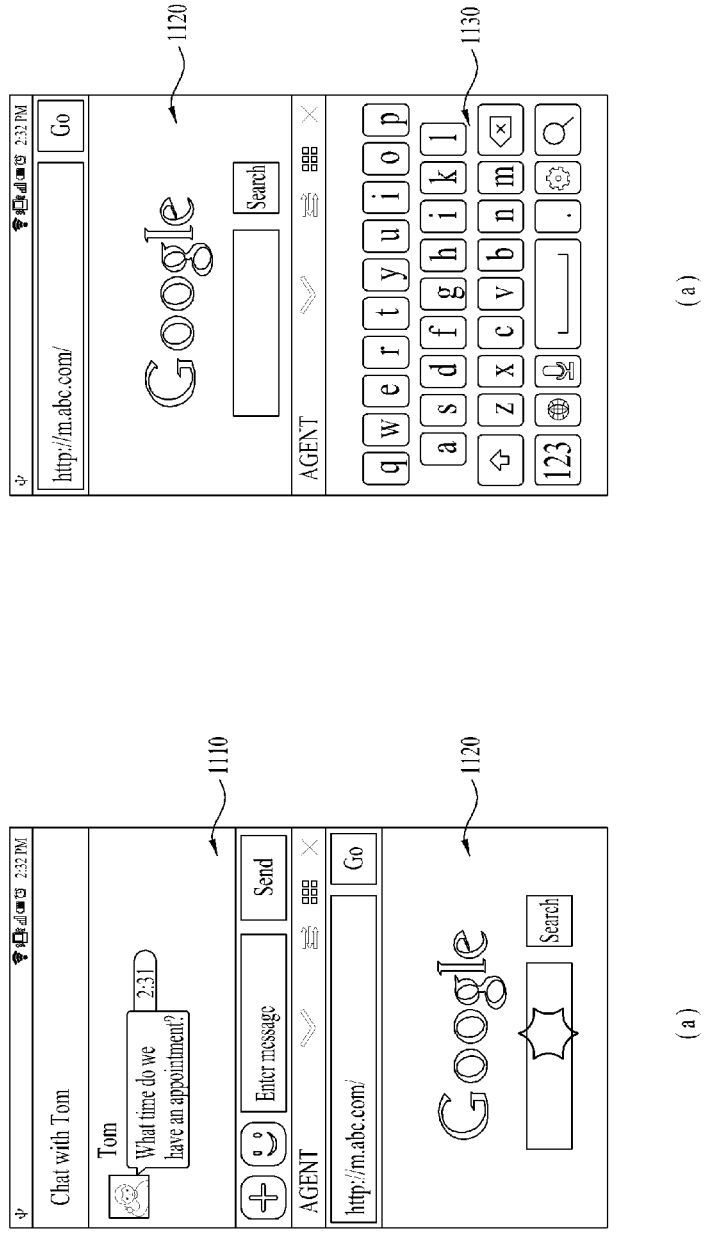

FIGS. 11A to 11C are diagrams illustrating one example to describe a process for outputting a virtual keypad to a touchscreen. Referring to FIG. 11A, if an event for displaying a virtual keypad 1130 occurs in one of a first region 1110 and a second region 1120, the controller 180 can display the virtual keypad 1130 on the touchscreen. For instance, if there occurs such an event for displaying the virtual keypad 1130 as a case of touching such a text input window as an address input window for inputting a URL address of a webpage, a search word input window for inputting a search word at a portal site, a message input window for inputting a content of message to be delivered to a prescribed counterpart and the like, the controller 180 can display the virtual keypad 1130 on the touchscreen.

While an output mode of the mobile terminal is set to a landscape mode, when attempting to output the virtual keypad 1130, referring to FIG. 11A, the controller 180 can display the virtual keypad 1130 across the first region 1110 and the second region 1120 overall irrespective of the fact that the corresponding event occurs in the first region 1110 or the second region 1120. This is to prevent the following inconvenience. First of all, if the virtual keypad 1130 is displayed on one of the first region 1110 and the second region 1120 only, it may cause inconvenience to a user in inputting a text.

If a text input window selected for a text input is located in a region for displaying the virtual keypad 1130, the controller 180 can control the text input window to be scrolled over the virtual keypad 1130 while outputting the virtual keypad 1130 in order to prevent the text input window, on which a text input through the virtual keypad 1130 is displayed, from being blocked by the virtual keypad 1130. Hence, a user can check whether a text is correctly input to the text input window.

Moreover, if an object currently output through at least one of the first region 1110 and the second region 1120 includes a chat screen of a chat with a prescribed counterpart, referring to FIG. 11A, the controller 180 can control a message, which has been transceived with the prescribed counterpart most recently, to be scrolled over the virtual keypad 1130. Hence, a user can input a text while viewing the most recently transceived with the prescribed counterpart.

In order for a user to recognize a region selected from the first region 1110 and the second region 1120 to display an input text thereon, the controller 180 may display the rest of regions except an event occurring region by being shaded. For instance, if an event for displaying the virtual keypad 1130 occurs in the first region 1110, referring to FIG. 11A, the controller 180 can control the second region 1120 to be shaded while the virtual keypad 1130 is displayed across the first region 1110 and the second region 1120. Hence, a user can recognize that a text input through the virtual keypad 1130 can be displayed on the first region 1110.

FIG. 11B and FIG. 11C are diagrams illustrating one example to describe that the virtual keypad 1130 is displayed when setting an output mode of the mobile terminal to a portrait mode. For clarity of the following description, assume that a top part and a bottom part of the touchscreen include a first region 1110 and a second region 1120, respectively.

Referring to FIG. 11B and FIG. 11C, when an output mode of the mobile terminal is set to a portrait mode, unlike the example when setting the output mode of the mobile terminal to the landscape mode, a screen configuration can be changed depending on whether an event occurs in the first region 1110 or the second region 1120.

First of all, referring to FIG. 11B, if an event for displaying the virtual keypad 1130 occurs in the first region 1110 of the top part of the touchscreen, the controller 180 can display the virtual keypad 1130 at least one portion of the second region 1120 while maintaining an output of the first region 1110 intact. On the other hand, referring to FIG. 11C, if an event for displaying the virtual keypad 1130 occurs in the second region 1120 of the bottom part of the touchscreen, the controller 180 can display the virtual keypad 1130 on at least one portion of the second region 1120 while shifting an output screen of the second region 1120 to the first region 1110. This is to prevent a region for inputting a text thereto from being blocked by the virtual keypad 1130.

Various methods of partitioning a touchscreen into a first region and a second region according to embodiments of the present invention are described in detail in the foregoing descriptions. In the following description, a method of sharing data with a prescribed counterpart after partitioning the touchscreen into the first region and the second region shall be described in detail.

<Data Sharing with Prescribed Counterpart>

When a touchscreen is partitioned into a first region and a second region, a first application and a second application can be active through the first region and the second region. For instance, in the examples shown in FIG. 5 and FIG. 6, a user can activate the first application through a manipulation of the home screen displayed through the first region. In addition, the user can also activate the second application through the application list displayed through the second region. In another instance, in the example shown in FIG. 7, it can activate the first application through a manipulation of the home screen. In addition, the user can also activate the second application through the object touched & dragged to the display agent bar.

In another instance, in the examples shown in FIGS. 8 to 10, the message or camera application activated before partitioning the touchscreen into the first region and the second region becomes the first application activated in the first region and the second application can be activated in accordance with a type of an event occurring in the mobile terminal and an attribute of a hyperlink object.

In the mobile terminal according to another embodiment of the present invention, after the touchscreen has been partitioned into a first region and a second region, a first application or a second application may be activated by touching & dragging a prescribed object displayed on one of the first region and the second region to the other. For instance, if an icon for activating a prescribed application displayed through the first region is dragged to the second region, an active screen of the prescribed application can be displayed through the second region in the manner similar to that described with reference to FIG. 7A.

In another instance, if a contact of a prescribed counterpart displayed through the first region is dragged to the second region, an application for making contact with the prescribed counterpart may be activated through the second region in the manner similar to that described with reference to FIG. 7B. Moreover, while a group chat with a plurality of counterparts is in progress through the first region, if a profile icon of at least one of a plurality of the counterparts or a message received from at least one of a plurality of the counterparts is dragged to the second region, an application for displaying a chat window for a chat with a selected counterpart may be activated through the second region in the manner similar to that described with reference to FIG. 7C.

The first and second applications activated through the first region and the second region may include applications different from each other but may include the same application. When the first region and the second region include the same application, an operation of the mobile terminal shall be described in detail with reference to FIGS. 12A to 12C as follows.

Figure 12A:
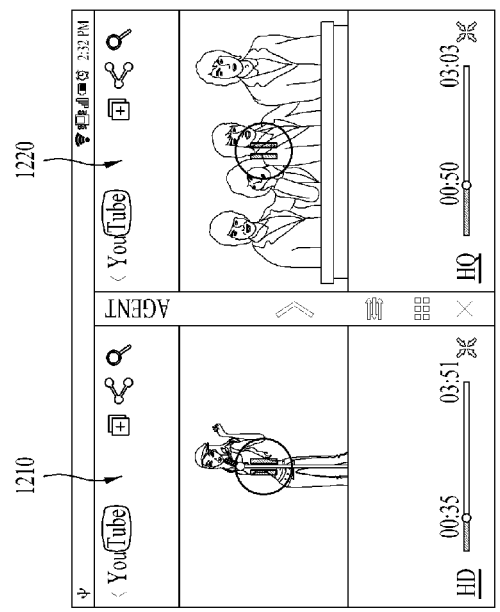
Figure 12B:
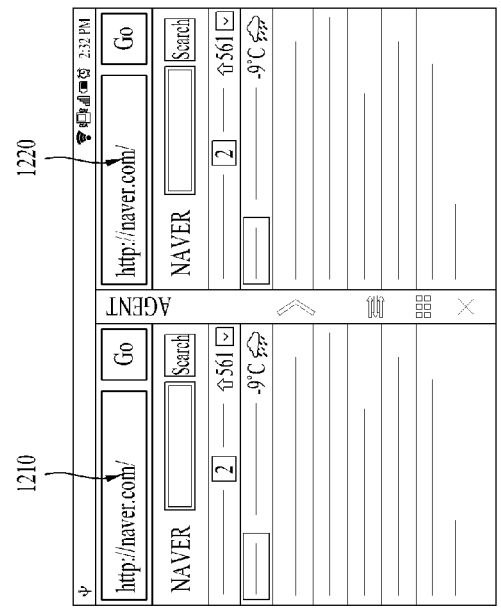

FIGS. 12A to 12C are diagrams illustrating one example to describe an operation of a mobile terminal if a first application and a second application are identical to each other. In particular, FIG. 12A is a diagram illustrating one example when each of a first application and a second application includes a video play application.

Referring to FIG. 12A, if each of a first application and a second application includes a video play application, the controller 180 plays a first video and a second video through a first region 1210 and a second region 1220, respectively, thereby providing a user with convenience in playing a plurality of videos simultaneously.

FIG. 12B is a diagram illustrating an example of when each of a first application and a second application includes a web browser. Referring to FIG. 12B, if each of a first application and a second application includes a web browser, a user refers a first webpage through the first region 1210 and also refers a second webpage through the second region 1220, thereby being provided with convenience in referring a plurality of webpages simultaneously.

FIG. 12C is a diagram for example of a case that each of a first application and a second application includes a message. Referring to FIG. 12C, if each of a first application and a second application includes a message application, a user performs a chat with a first counterpart through the first region 1210 and also performs a chat with a second counterpart through the second region 1220, thereby being provided with convenience in performing chats with a plurality of counterparts simultaneously.

When a chat window for a chat with a prescribed counterpart is displayed through at least one of a first region and a second region, the mobile terminal according to the present invention facilitates a data sharing with the prescribed counterpart. For clarity of the following description, a chat window for a chat with a prescribed counterpart is displayed through a first region of the touchscreen partitioned into the first region and the second region.

Figure 13:
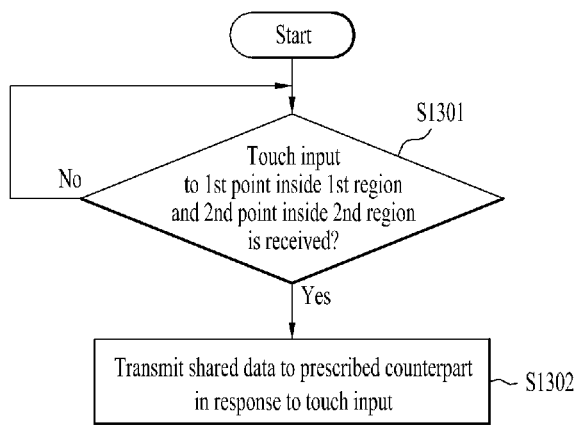
FIG. 13 is a flowchart illustrating an operation of a mobile terminal according to the present invention.

FIG. 13 is a flowchart illustrating an operation of a mobile terminal according to the present invention. Referring to FIG. 13, if a first point inside the first region of the touchscreen and a second point inside the second region of the touchscreen are touched (Yes in S1301), the controller 180 can transmit a shared data in the second region to a prescribed counterpart (S1302). In this instance, the shared data in the second region may include at least one of a data displayed through the second region, a data file displayed through the second region and a data created from the second application currently running in the second region.

The touch to the first point and the second point can be implemented in various ways including a drag input to the second point from the first point, a drag input to the first point from the second point, a touch input applied to both of the first point and the second point substantially at the same time, and the like. Methods of sharing data with a prescribed counterpart according to various embodiments of the present invention are described in detail as follows. For clarity, assume that a touch to a first point and a second point includes a drag input to the first point from the second point in the following descriptions with reference to the accompanying drawings.

Figure 14:
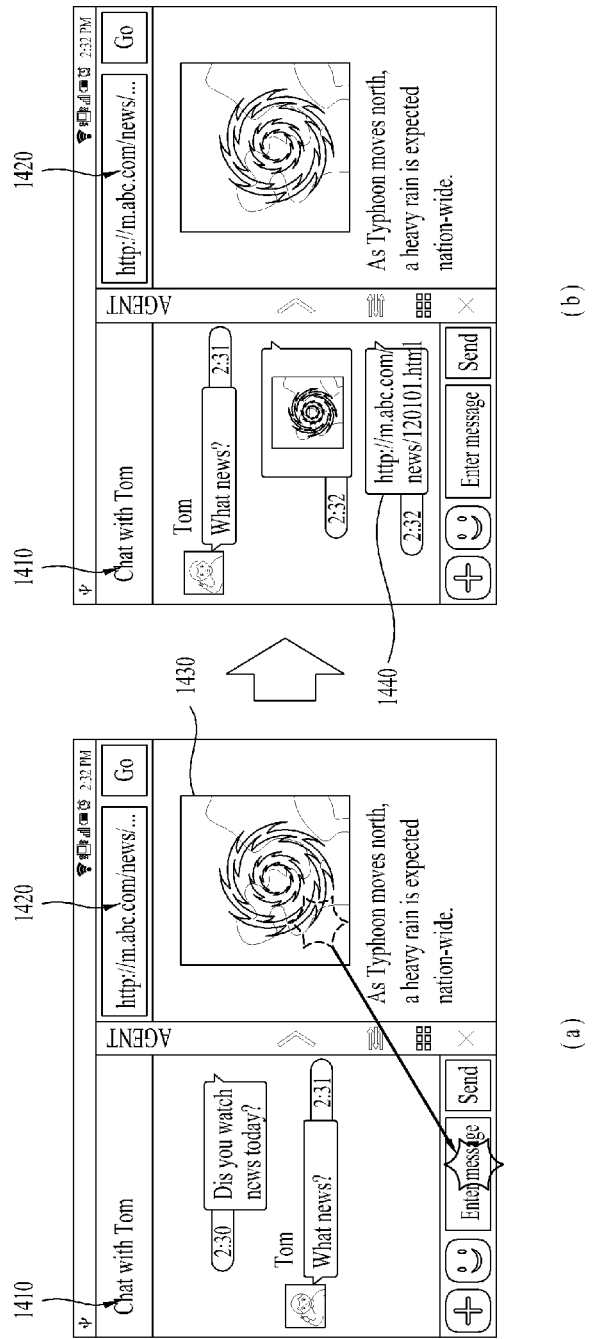
FIG. 14 is a diagram of one example to describe a process for transmitting data displayed through a second region to a prescribed counterpart.
Figure 15:
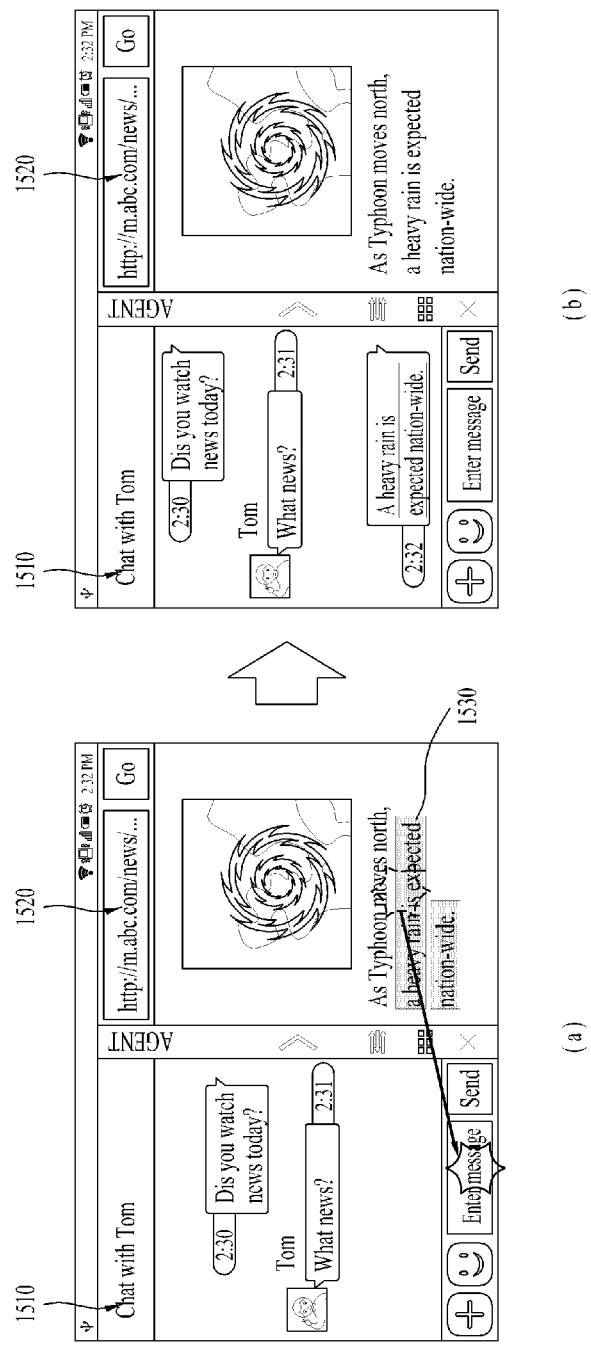
FIG. 15 is a diagram of another example to describe a process for transmitting data displayed through a second region to a prescribed counterpart.

FIG. 14 is a diagram of one example to describe a process for transmitting data displayed through a second region to a prescribed counterpart. In addition, FIG. 15 is a diagram of another example to describe a process for transmitting data displayed through a second region to a prescribed counterpart. For clarity of the following description, assume that a webpage configured with an image and text is displayed on a second region 1420/1520.

Referring to FIG. 14, if an image 1430 included in a webpage displayed through a second region 1420 is dragged to a first region 1410 for displaying a content of a chat with a prescribed counterpart (FIG. 14 (a)), the controller 180 can transmit the dragged image 1430 to the prescribed counterpart (FIG. 14 (b)).

Referring to FIG. 15, if a text 1530 included in a webpage displayed through a second region 1520 is dragged to a first region 1510 for displaying a content of a chat with a prescribed counterpart (FIG. 15 (a)), the controller 180 can transmit the dragged text 1520 to the prescribed counterpart (FIG. 15 (b)).

Like the examples shown in FIG. 14 and FIG. 15, if the data displayed through the second region 1420/1520 is dragged to the first region 1410/1510, the controller 180 can transmit the dragged data to a prescribed counterpart. After the data displayed through the second region has been copied, if the data to be shared is just dragged to the first region without pasting the copied data on the first region, the corresponding data can be shared with the prescribed counterpart. Therefore, the convenience in using the mobile terminal can be enhanced.

FIG. 14 and FIG. 15 just show the examples of displaying the webpage on the second region for the convenience of the description, by which the present invention may be non-limited. Unlike the examples shown in FIG. 14 and FIG. 15, various kinds of contents including a memo input by a user, a message received from another counterpart, a message sent to another counterpart, a received message and the like can be displayed on the second region.

Like the examples shown in FIG. 14 and FIG. 15, when a content included in the webpage is transmitted to a prescribed counterpart, the controller 180 can transmit meta information to the prescribed counterpart. In this instance, the meta information may include at least one of a URL address of the webpage, a URL address for accessing an image included in the webpage and the like.

When the meta information is transmitted to a prescribed counterpart, referring to FIG. 14 (b), the controller 180 can transmit the meta information included in the webpage as a separate message 1440 to the prescribed counterpart. If so, the counterpart having received the message may attempt an access to a URL indicated by the meta information by touching the message having the meta information recorded therein.

In another instance, the controller 180 can transmit a content having the meta information set to a hyperlink object to a prescribed counterpart. For example, referring to FIG. 15 (b), if a URL of the webpage is set to a hyperlink object in a text transmitted to a prescribed counterpart, the counterpart having received the message may attempt an access to the URL of the webpage by touching the text.

Figure 16:
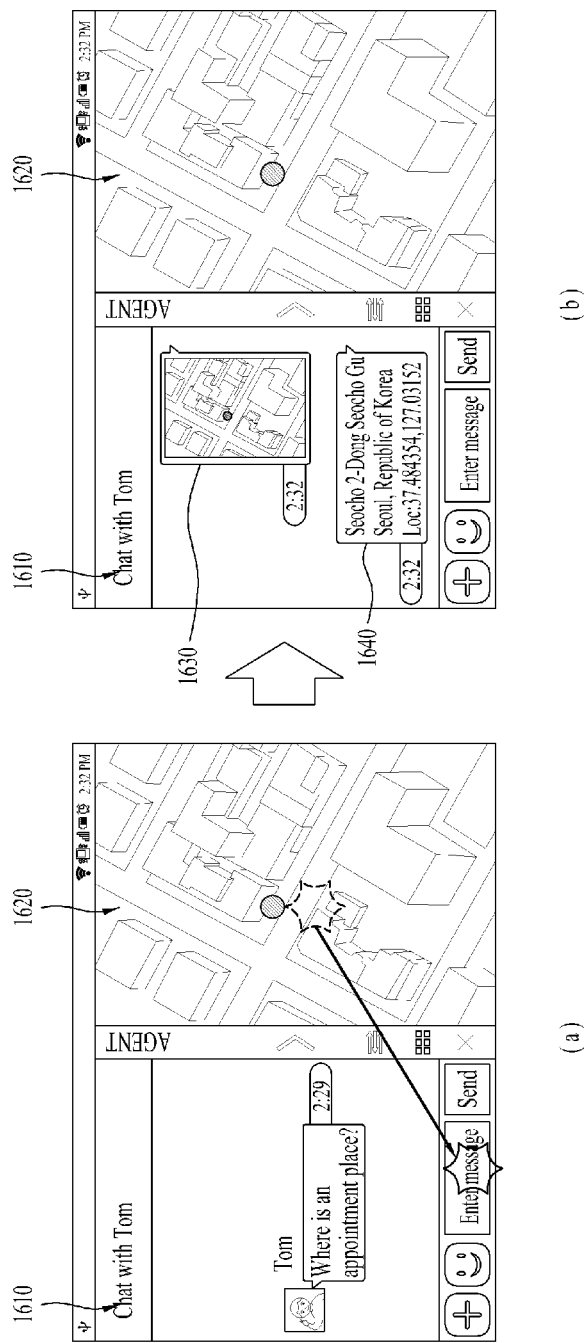
FIG. 16 is a diagram of a further example to describe a process for transmitting data displayed through a second region to a prescribed counterpart.

FIG. 16 is a diagram of a further example to describe a process for transmitting data displayed through a second region to a prescribed counterpart. For clarity of the following description, assume that a map is displayed on a second region of the touchscreen.

Referring to FIG. 16, if a drag input to a first region 1610 from a second region 1620 is received (FIG. 16 (a)), the controller 180 can transmit a capture image 1630 of capturing at least one portion of the second region 1620 to a prescribed counterpart (FIG. 16 (b)). Like the example shown in FIG. 16, the capture image 1630 of the map displayed through the second region 1620 is transmitted to a prescribed counterpart, whereby a location sharing with the counterpart is facilitated.

FIG. 16 shows the example of displaying the map on the second region 1620 for clarity of the corresponding description, by which the present invention may be non-limited. Unlike the example shown in FIG. 16, various formats of data files including a document file, a music file, a video file and the like can be shared with a prescribed counterpart as well.

Further, when the capture image of the map is transmitted to the prescribed counterpart, referring to FIG. 16 (b), the controller 180 can transmit at least one 1640 of an address information and a coordinates information transmitted to the prescribed counterpart.

Figure 17:
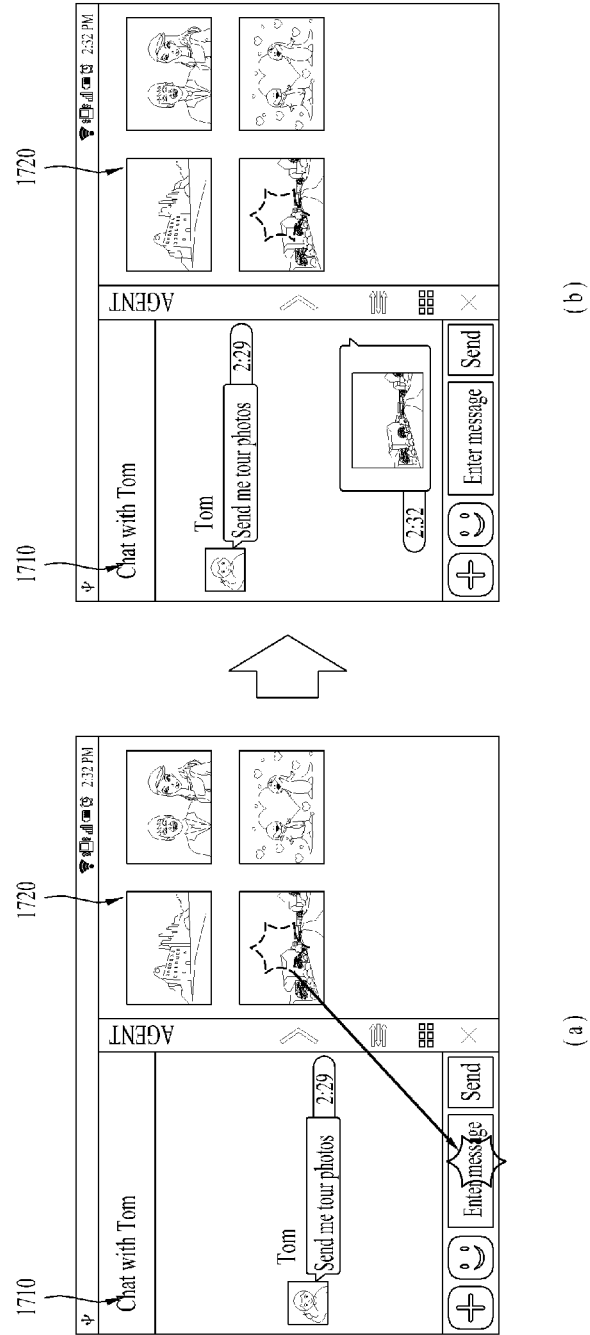
FIG. 17 is a diagram of one example to describe a process for transmitting a data file saved in a memory to a prescribed counterpart.

FIG. 17 is a diagram of one example to describe a process for transmitting a data file saved in a memory to a prescribed counterpart. For clarity of the following description, assume that a list of image files saved in the memory 160 is displayed on a second region. Referring to FIG. 17, if a prescribed image file selected by a user from an image file list displayed through a second region 1720 is dragged to a first region 1710 for displaying a content of a chat with a prescribed counterpart (FIG. 17 (a)), the controller 180 can transmit the dragged image file to the prescribed counterpart (FIG. 17 (b)).

Like the example shown in FIG. 17, if a data file displayed on the second region 1720 is dragged to the first region 1710, the controller 180 can transmit the dragged data file to a prescribed counterpart. Hence, a user can share the data file without a separate step of attaching the file, thereby enhancing convenience in using the mobile terminal.

FIG. 17 shows one example of displaying the image file list saved in the memory 160 through the second region 1720 for clarity of the corresponding description, by which the present invention is non-limited.

Figure 18:
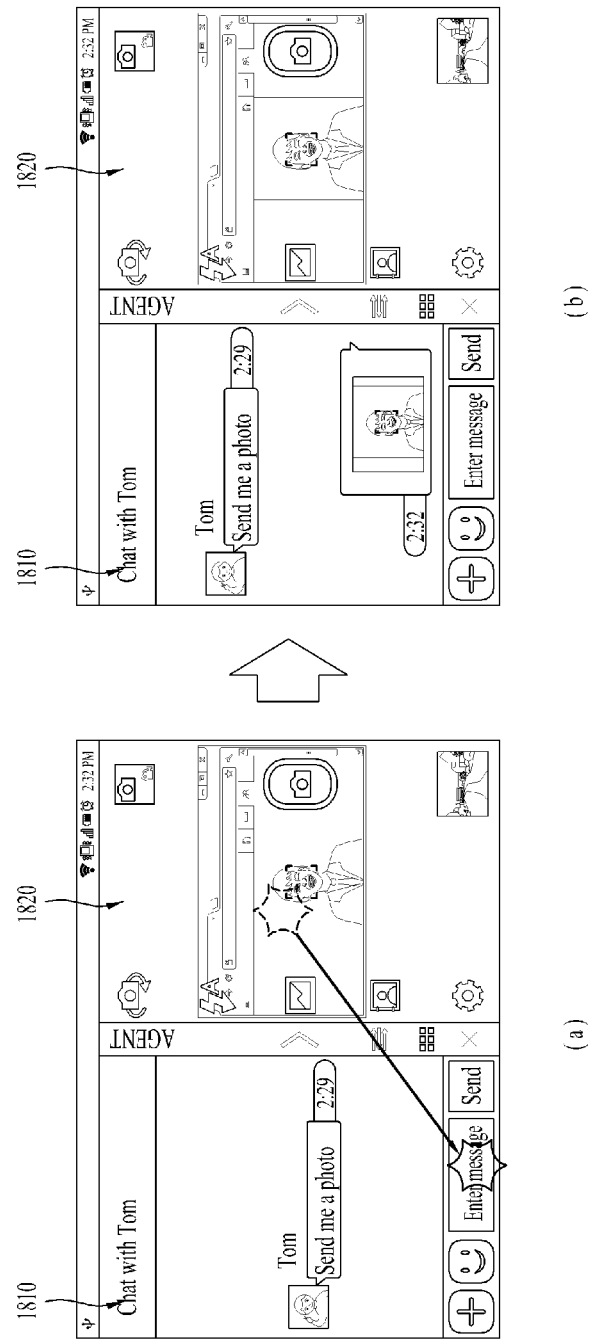
FIG. 18 is a diagram of one example to describe a process for transmitting data created a second application to a prescribed counterpart.

Next, FIG. 18 is a diagram of one example to describe a process for transmitting data created a second application to a prescribed counterpart. For clarity of the following description, assume that a preview image output from the camera 121 is displayed on a second region 1820. Referring to FIG. 18, if a drag input from a second point of a second region 1820 to a first point of a first region 1810 is received (FIG. 18 (a)), the controller 180 captures a photo to through the camera 121 and then transmits the taken photo to a prescribed counterpart (FIG. 18 (b)).

If a drag input from the second region 1820 to the first region 1810 is received, as shown in FIG. 18, a photographing is automatically performed and the taken photo is automatically transmitted to a prescribed counterpart, whereby the taken photo can be easily shared with the corresponding counterpart while a user has a chat with the corresponding counterpart.

If the drag input to the first region 1810 from the second region 1820 is complete, i.e., if a pointer is released from the first region 1810, the controller 180 can capture a photo through the camera 121. In another instance, if the pointer for the drag input to the first region 1810 from the second region 1820 deviates from the second region 1820, the controller 180 may capture a photo through the camera 121.

In the examples shown in FIG. 14 and FIG. 18, a chat window for a chat with a single counterpart is displayed through the first region. If a group chat with a plurality of counterparts is in progress through the first region of the touchscreen, data to be shared may be transmitted to all of the counterparts in response to a touch to a first point inside the first region and a second point inside the second region.

According to another embodiment of the present invention, the controller 180 can control data, which is to be shared, to be transmitted only to a prescribed counterpart specified by a touch to a first point among a plurality of counterparts. This shall be described in detail with reference to FIG. 19 as follows.

Figure 19:
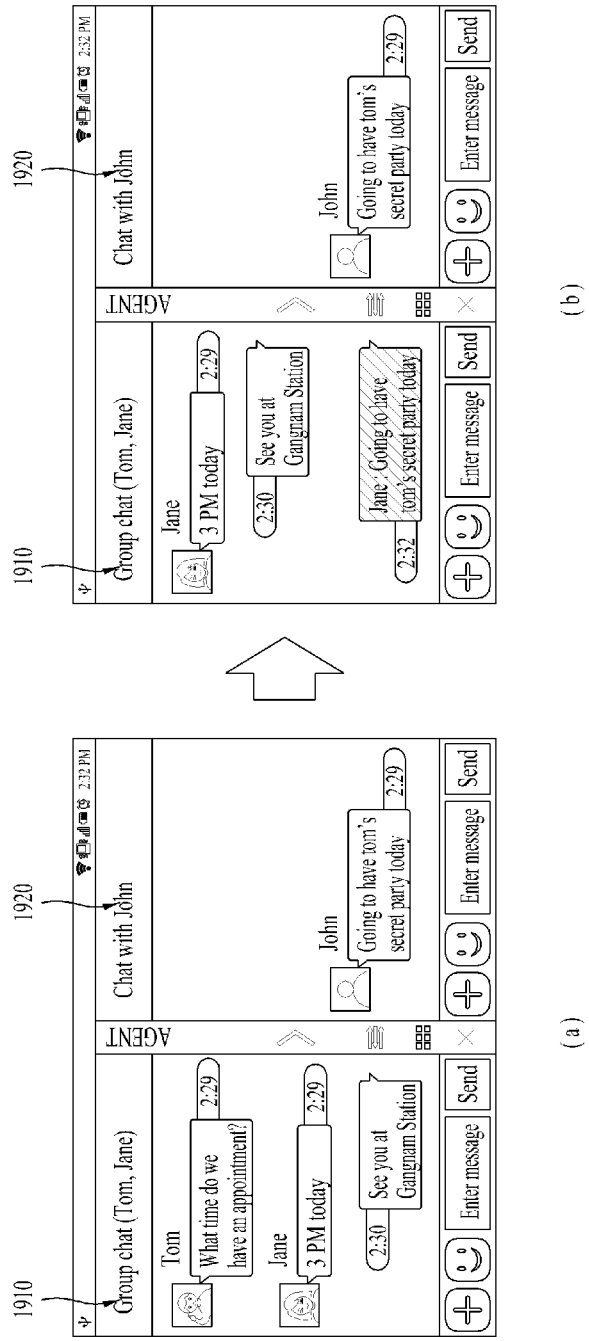
FIG. 19 is a diagram of one example to describe a process for transmitting data to share to a prescribed one of a plurality of counterparts having a group chat in progress only.

FIG. 19 is a diagram of one example to describe a process for transmitting data to share to a prescribed one of a plurality of counterparts having a group chat in progress only. For clarity of the following description, assume that a group chat with a first counterpart and a second counterpart is in progress through a first region. In addition, assume that a chat with a third counterpart is in progress through a second region.

Referring to 19 (a), if a second point inside a second region 1920 and a first point inside a first region 1910 are touched, the controller 180 can control a message with a third counterpart specified by the touch to the second point to be personally transmitted to a counterpart specified by the touch to the first point. In the example shown in FIG. 19 (a), because the first point indicates a profile image of Jane, the controller 180 can control a message, which is received from John specified by the touch to the second point, to be personally transmitted to Jane.

In this instance, the personally transmitted message may mean the message having recipients set to some of participants participating in the group chat instead of setting recipients to all participants participating in the group chat.

When a message is personally transmitted to a prescribed one of a plurality of counterparts, the controller 180 can display the personally transmitted message being visually discriminated from a message transmitted for a group chat. In particular, the controller 180 can display a personally received message and a message received for a group chat by being visually discriminated from each other based on a style of type, a font size, a presence or non-presence of highlight and/or the like. Like the example shown in FIG. 19 (b), while a group chat with Tom and Jane is in progress, if a message is personally transmitted to Jane, the controller 810 may display the message having recipients set to Tom and Jane and the message personally transmitted to Jane by being visually discriminated from each other.

For clarity of the above description, FIG. 19 shows one example that a message is received from another counterpart as data to be shared with a prescribed counterpart. However, data to be shared with a prescribed counterpart is not limited by the example shown in FIG. 19. Various data described with reference to FIG. 14 and FIG. 18 can be applied to FIG. 19 as well.

In the example shown in FIG. 13, if the first point inside the first region and the second point inside the second region are touched, at least one of the data displayed through the second region, the data created from the second application running in the second region and the data file saved in the memory 160 can be transmitted to a prescribed counterpart currently having a chat in the first region.

Contrary to the example shown in FIG. 13, the controller 180 can create new data based on data in the first region, i.e., a message received from or transmitted to a prescribed counterpart or can control an operation of the second application currently running in the second region based on a message received from or transmitted to a prescribed counterpart. In the following description, operations of a mobile terminal using data displayed through a first region shall be explained in detail with reference to the following embodiments.

Figure 20:
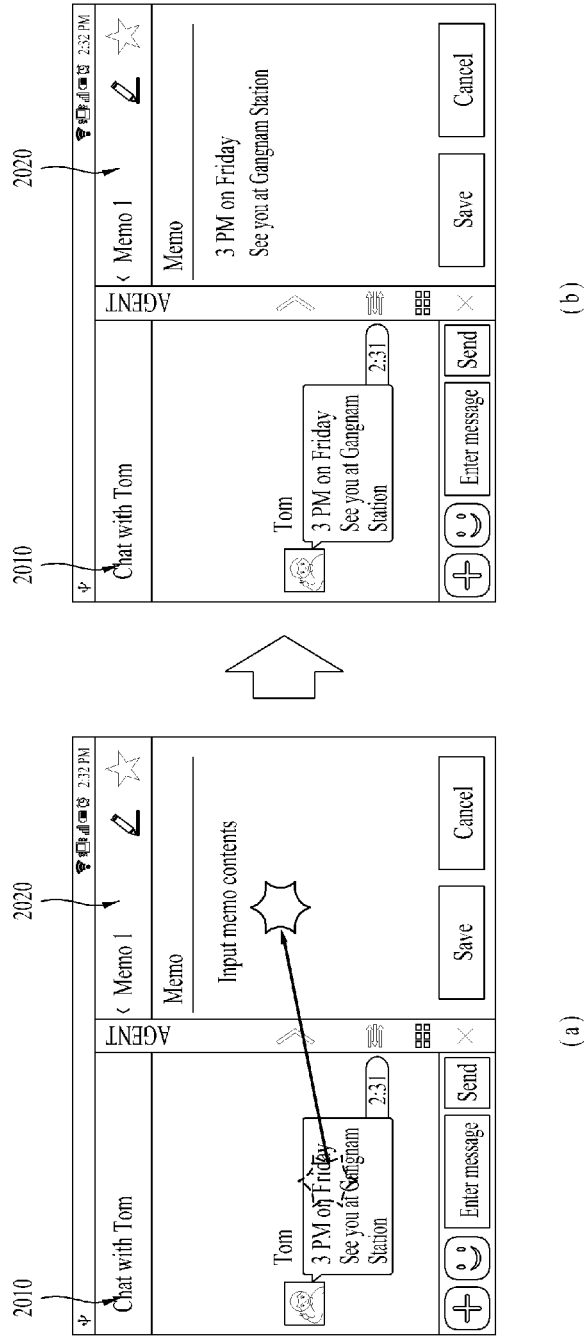
FIG. 20 is a diagram of one example to describe a process for inputting a memo using data displayed through a first region.
Figure 21:
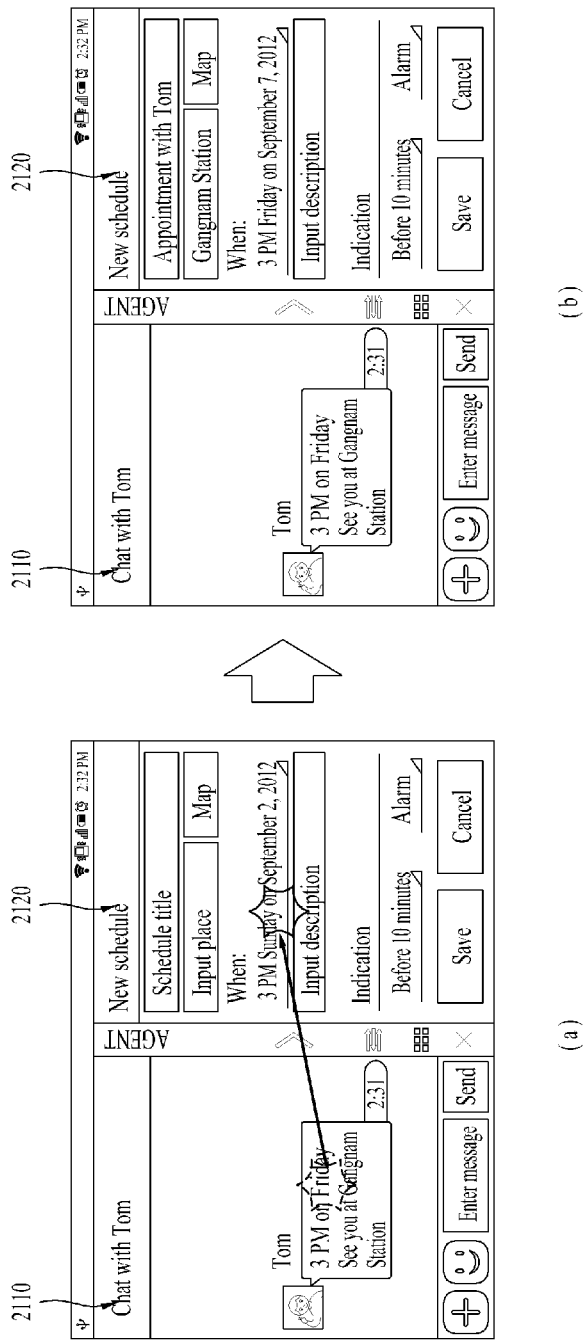
FIG. 21 is a diagram of one example to describe a process for adding a user schedule using data displayed through a first region.
Figure 22:
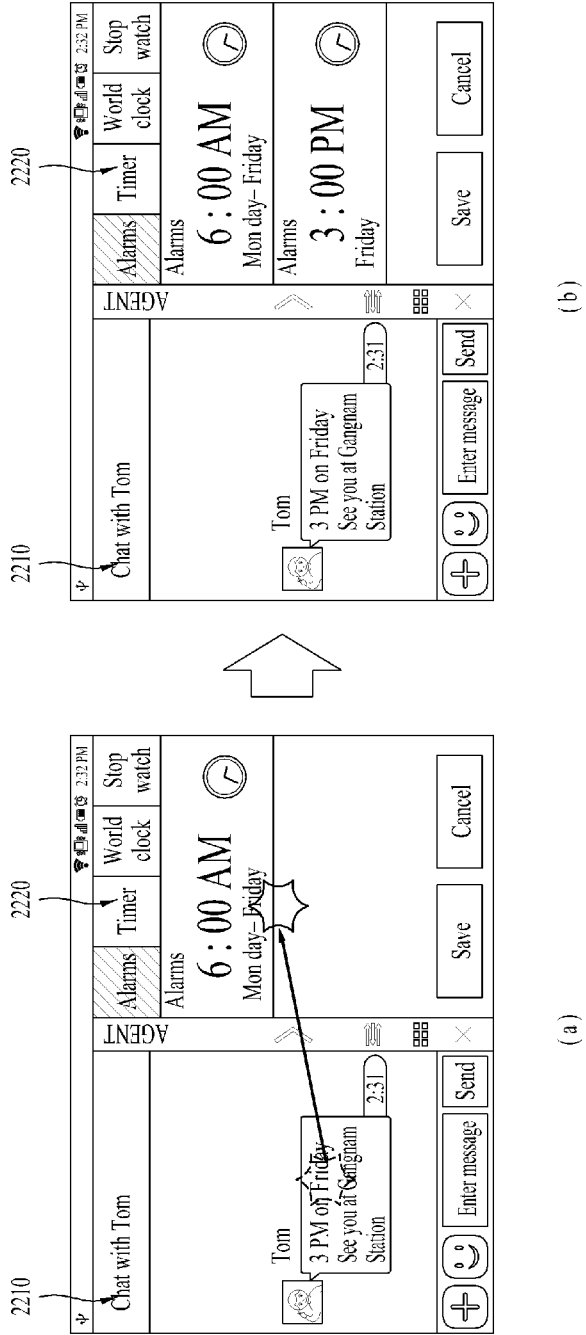
FIG. 22 is a diagram of another example to describe a process for adding a user schedule using data displayed through a first region.

Next, FIGS. 20 to 22 are diagrams for examples to describe a process for creating new data using data displayed through a first region. In particular, FIG. 20 is a diagram of one example to describe a process for inputting a memo using data displayed through a first region.

Referring to FIG. 20, assume that a memo creating screen for creating a memo is displayed on a second region 2020. If one of messages with a prescribed counterpart displayed through a first region 2010 is dragged to a second region 2020 (FIG. 20 (a)), the controller 180 can control the dragged message to be input to the memo creating screen (FIG. 20 (b)).

FIG. 21 is a diagram of one example to describe a process for adding a user schedule using data displayed through a first region. Referring to FIG. 21, assume that a schedule management screen for managing a user schedule is displayed through a second region 2120. If one of messages with a prescribed counterpart displayed through a first region 2110 is dragged to a second region 2120 (FIG. 21 (a)), the controller 180 extracts an appointment time and date or an appointment place from the dragged message and is then able to control a user schedule to be added based on the extracted data.

Thus, referring to FIG. 21 (b), in order to indicate that the added schedule relates to a schedule with the prescribed counterpart during having a chat in the first region 2110, the controller 180 can control a name of the prescribed counterpart to be inserted in a schedule title. In the example shown in FIG. 21, because a text string '3 PM on Friday' is included, the user schedule can be added to 3 PM on upcoming Friday.

FIG. 22 is a diagram of another example to describe a process for adding a user schedule using data displayed through a first region. Referring to FIG. 22, assume that an alarm setting screen for setting an alarm is displayed through a second region 2220. If one of messages with a prescribed counterpart displayed through a first region 2210 is dragged to a second region 2220 (FIG. 22 (a)), the controller 180 extracts a time and date from the dragged message and is then able to control an alarm to be added to the extracted time and date. In the example shown in FIG. 22, because a text string '3 PM on Friday' is included, the alarm can be added to 3 PM on upcoming Friday.

According to the examples shown in FIGS. 20 to 22, the controller 180 can easily create such new data in the mobile terminal as a memo, a schedule, an alarm and the like based on a message with a prescribed counterpart displayed through the first region.

Figure 23:
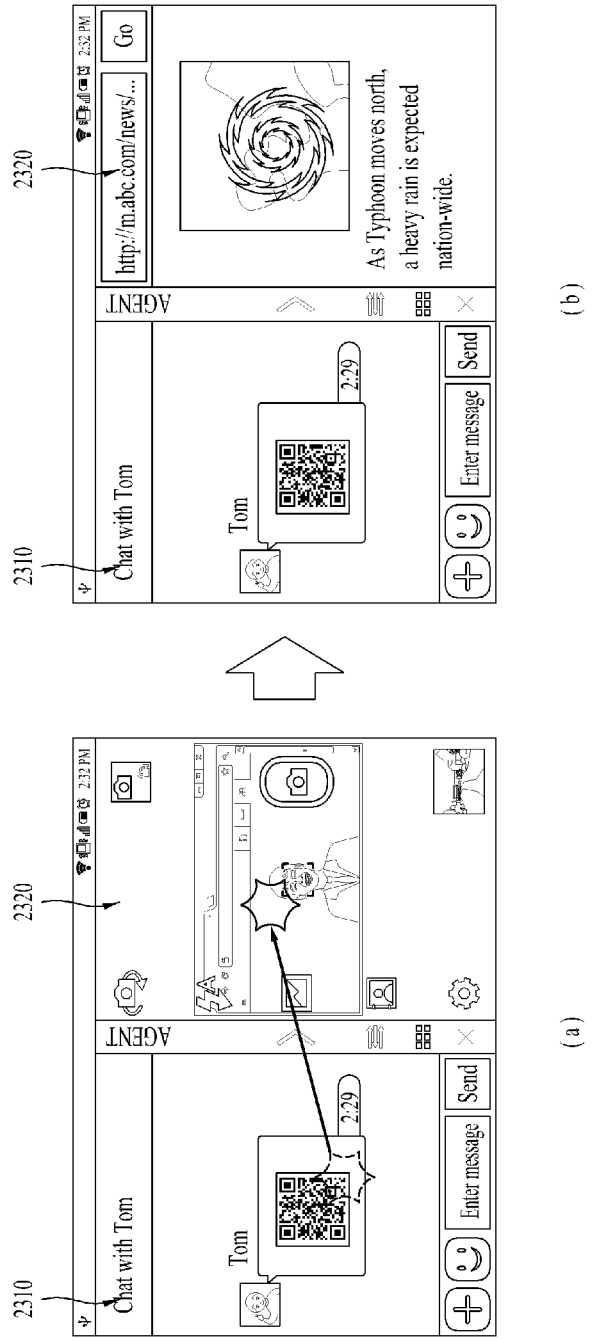
FIG. 23 is a diagram of one example to describe a process for controlling an operation of a second application running in a second region based on a prescribed counterpart's message displayed on a first region.

FIG. 23 is a diagram of one example to describe a process for controlling an operation of a second application running in a second region based on a prescribed counterpart's message displayed on a first region. For clarity of the following description, assume that a preview image output from the camera 121 is displayed on a second region 2320. In addition, assume that QR (quick response) code is included in a message specified by a touch to a first point.

Referring to FIG. 23 (a), if a message including QR code is dragged to a second region 2320, the controller 180 can scan the QR code included in the message. Thereafter, the controller 180 can display a QR code scan result through one of the first region 2310 and the second region 2320. For instance, if a URL address for an access to a prescribed webpage is read out from the QR code, referring to FIG. 23 (b), the controller 180 can display a web browser for an access to the read-out URL address on one of the first region 2310 and the second region 2320.

Like the example shown in FIG. 23, the controller 180 can facilitate a scan of such a smart code as QR code and the like based on a message with a prescribed counterpart displayed through the first region 2310.

Accordingly, embodiments of the present invention provide several advantages. First of all, the present invention provides a mobile terminal, thereby enhancing user's convenience. In particular, the present invention provides a mobile terminal, thereby facilitating a data sharing using a screen partitioned into two regions.

It will be appreciated by those skilled in the art that the present invention can be specified into other form(s) without departing from the spirit or scope of the inventions. In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a camera;
a wireless communication unit configured to perform wireless communication;
a touchscreen configured to display information; and
a controller configured to:
partition the touchscreen into a first region and second region,
display a chat window for displaying chatting contents included in a chatting session with at least one counterpart terminal in the first region,
display a preview image received via the camera in the second region, and
control the camera to automatically take a picture and transmit the picture to the counterpart terminal communicating by the chat window when a drag input dragging a pointer from one of the first and second regions to the other one of the first and second regions is received.

2. The mobile terminal of claim 1, wherein the controller is further configured to partition the first and second regions via a display agent bar.

3. The mobile terminal of claim 2, wherein the controller is further configured to change sizes of the first and second regions based on a shifting of the display agent bar.

4. The mobile terminal of claim 1, wherein the controller is further configured to display an output image, which has been output before the touchscreen is partitioned into the first and second regions, on one of the first and second regions and display an application list on the other of the first and second regions.

5. The mobile terminal of claim 4, wherein the application list comprises at least one of a list of most recently activated applications, a list of applications currently running in background state and a list of frequently-used applications.

6. The mobile terminal of claim 1, wherein the controller is further configured to partition the touchscreen into the first and second regions in response to an occurrence of an event in the mobile terminal.

7. The mobile terminal of claim 6, wherein the event comprises at least one of a reception of a text message, a reception of an instant message, a reception of an email and a reception of a call signal.

8. The mobile terminal of claim 1, wherein the chat window displayed in the first region is a group chat window for a group chat with a plurality of group members including the at least one counterpart terminal, and wherein the controller is further configured to:
display another chat window with another counterpart terminal, and
transmit a message from the other counterpart terminal to a group member specified by the first point.

9. The mobile terminal of claim 1, wherein when the chat window displayed in the first region is a group chat window for a plurality of group members including the at least one counterpart terminal, the controller is further configured to transmit the data only to a specified group member specified by the first point.

10. A method of controlling a mobile terminal, the method comprising:
displaying, via a touchscreen of the mobile terminal, information;
partitioning, via a controller of the mobile terminal, the touchscreen into a first region and second region;
displaying, via the touchscreen, a chat window for displaying chatting contents included in a chatting session with at least one counterpart terminal in the first region;
displaying, via the touchscreen, a preview image received via a camera in the second region; and
automatically taking a picture via the camera and transmitting, via a wireless communication unit, the picture to the counterpart terminal communication by the chat window when a drag input dragging a pointer from one of the first and second regions to the other one of the first and second regions is received.

* * * * *